US008682723B2

(12) United States Patent
Parsons et al.

(10) Patent No.: US 8,682,723 B2
(45) Date of Patent: Mar. 25, 2014

(54) SOCIAL ANALYTICS SYSTEM AND METHOD FOR ANALYZING CONVERSATIONS IN SOCIAL MEDIA

(75) Inventors: Todd Parsons, San Francisco, CA (US); Mitch Ratcliffe, Lakewood, WA (US); Rob Crumpler, San Francisco, CA (US); Will Kessler, San Francisco, CA (US); Kurt Freytag, Oakland, CA (US)

(73) Assignee: Twelvefold Media Inc., San Francisco, CA (US)

( * ) Notice: Subject to any disclaimer, the term of this patent is extended or adjusted under 35 U.S.C. 154(b) by 26 days.

(21) Appl. No.: 12/558,788

(22) Filed: Sep. 14, 2009

(65) Prior Publication Data

US 2010/0070485 A1 Mar. 18, 2010

Related U.S. Application Data

(63) Continuation of application No. 11/680,537, filed on Feb. 28, 2007, now abandoned.

(60) Provisional application No. 60/777,975, filed on Feb. 28, 2006.

(51) Int. Cl.
*G06Q 30/00* (2012.01)

(52) U.S. Cl.
USPC ............... 705/14.52; 705/14.6; 705/14.73; 707/709; 707/710

(58) Field of Classification Search
None
See application file for complete search history.

(56) References Cited

U.S. PATENT DOCUMENTS

| | | | |
|---|---|---|---|
| 5,832,502 A * | 11/1998 | Durham et al. ........................ 1/1 |
| 6,151,585 A * | 11/2000 | Altschuler et al. ............... 705/10 |
| 6,493,702 B1 | 12/2002 | Adar et al. |
| 7,082,427 B1 * | 7/2006 | Seibel et al. ................... 707/661 |
| 7,146,416 B1 * | 12/2006 | Yoo et al. ....................... 709/224 |
| 7,818,392 B1 * | 10/2010 | Martino et al. ................ 709/217 |
| 8,046,259 B1 * | 10/2011 | Siegel et al. ................ 705/14.73 |
| 2002/0052919 A1 * | 5/2002 | Morris et al. .................. 709/205 |
| 2002/0062368 A1 * | 5/2002 | Holtzman et al. ............ 709/224 |
| 2002/0138588 A1 | 9/2002 | Leeds |
| 2002/0161838 A1 * | 10/2002 | Pickover et al. .............. 709/204 |
| 2003/0055711 A1 * | 3/2003 | Doherty .......................... 705/10 |
| 2003/0182310 A1 * | 9/2003 | Charnock et al. .......... 707/104.1 |
| 2004/0111467 A1 | 6/2004 | Willis |
| 2004/0148275 A1 | 7/2004 | Achlioptas |
| 2004/0255122 A1 * | 12/2004 | Ingerman et al. ............. 713/176 |
| 2004/0267604 A1 * | 12/2004 | Gross .............................. 705/10 |
| 2005/0131897 A1 | 6/2005 | Grasso et al. |
| 2005/0154556 A1 * | 7/2005 | Keller et al. ................... 702/181 |
| 2005/0223061 A1 * | 10/2005 | Auerbach et al. ............. 709/206 |
| 2005/0256866 A1 * | 11/2005 | Lu et al. ............................ 707/5 |
| 2006/0004691 A1 | 1/2006 | Sifry |
| 2006/0235873 A1 | 10/2006 | Thomas |
| 2006/0242013 A1 * | 10/2006 | Agarwal et al. ................ 705/14 |

(Continued)

OTHER PUBLICATIONS

"Trust Networks on the Semantic Web," by Golbeck et al. IN: Cooperative Information Agents VII, pp. 238-249 (2003). Available at: SpringerLink.*

(Continued)

*Primary Examiner* — Daniel Kinsaul
(74) *Attorney, Agent, or Firm* — Cooley LLP

(57) ABSTRACT

Conversations in an online content universe are monitored. A social analysis module analyzes individual conversations between publishers in the online content universe. Publishers that influence a conversation are identified.

10 Claims, 25 Drawing Sheets

(56) References Cited

U.S. PATENT DOCUMENTS

2006/0259473 A1* 11/2006 Li et al. .............................. 707/3
2007/0121843 A1   5/2007 Atazky et al.
2008/0235083 A2*  9/2008 Bosarge et al. ................. 705/14

OTHER PUBLICATIONS

"Propagation Models for Trust and Distrust in Social network," by Ziegler and Lausen. IN: Information Systems and Frontiers, pp. 337-358 (Dec. 2005). Available at: SpringerLink.*
"Topic-Sensitive PageRank: A Context-sensitive Ranking Algorithm for Web Search," by Haveliwala, Taher. IN: IEEE Transactions on Knowledge and Data Engineering (2003). Available at: http://infolab.stanford.edu/~taherh/papers/topic-sensitive-pagerank-tkde.pdf.*
Adar et al., "Implicit Structure and the Dynamics of Blogspace" by Adar et al, Workshop on the Weblogging Ecosystem, 13th International World Wide Web Conference 2004, 8 pages. Available at http://www.blogpulse.com/papers/www2004adar.pdf.
Buzzlogic, Inc., International Search Report and Written Opinion for International Patent Application No. PCT/US2007/063005, Feb. 12, 2008.
Sack, "Conversation Map: A Content-Based Usenet Newsgroup Browser" by Warren Sack, International Conference on Intelligent User Interfaces, 2000, pp. 223-240. Available at http://portal.acm.org/citation.cfm?id=325856.
Parsons et al., U.S. Appl. No. 11/680,537, filed Feb. 28, 2007 for "Social Analytics System and Method for Analyzing Conversations ni Social Media." Office Action mailed Mar. 17, 2009.
Parsons, U.S. Appl. No. 12/264,168, filed Nov. 3, 2008 for "System and Method for Advertisement Targeting of Conversations in Social Media." Final Office Action mailed Jan. 19, 2012.
U.S. Appl. No. 11/680,537, filed Feb. 28, 2007 for "Social Analytics System and Method for Analyzing Conversations in Social Media." Office Action mailed Mar. 17, 2009.
U.S. Appln. No. 12/264,168, filed Nov. 3, 2008 for "System and Method for Advertisement Targeting of Conversations in Social Media." Office Action mailed May 11, 2011.
de Castro Palomares, Supplementary European Search Report and Preliminary Opinion, issued to corresponding patent application No. EP 07 75 7446, Mar. 26, 2012, 5 pgs.
Glance et al., "BlogPulse: Automated Trend Discovery for Weblogs", Retrieved from the Internet: URL: http://www.blogpulse.com/papers/www2004glance.pdf, Jan. 1, 2004, pp. 1-8.

* cited by examiner

SOCIAL ANALYTICS SYSTEM AND METHOD FOR ANALYZING CONVERSATIONS IN SOCIAL MEDIA

CROSS-REFERENCE TO RELATED APPLICATIONS

This application is a continuation of U.S. application Ser. No. 11/680,537, filed Feb. 28, 2007, now abandoned which application claims the benefit of and priority to Provisional Application No. 60/777,975, filed on Feb. 28, 2006, which applications are hereby incorporated by reference in their entirety.

FIELD OF THE INVENTION

The present invention is generally related to techniques to analyze conversations within a conversational network. More particularly, the present invention is directed to analyzing the influence of social media content and its publishers within a conversational network.

BACKGROUND OF THE INVENTION

The Internet is increasingly used as a platform for social media. Web logs (blogs) and wikis are two common forms of social media. However, more generally social media may also include interactive aspects, such as voting, comments, and trackback and take many different forms. Referring to FIG. 1A, social media generally describes online technologies and practices that people use to share opinions, insights, experience and perspectives with each other. Examples of social media include social networks, blogging systems, media sharing platforms, online forums, and meme aggregators.

Social media is based on widely available tools that provide users the ability to create links and trackbacks that tend to foster and describe their trust relationships. There are several aspects of social media that foster trust relationships. One aspect of social media that fosters trust relationships in social media is the level of dedication of individual publishers. Publishing social media content is an expression of unique interest in a topic. Individuals participating in a conversation around this content invest time to read, trackback, tag, rate, and/or comment on what is being shared. The level of dedication of the publishers of social media and individuals participating in conversation around it is one factor that promotes trust within social media. The trust relationships also develop due to the ability of individuals participating in a conversation to comment about postings to add context and correct errors. Additionally, social media permits links to be established between publishers. The links between publishers foster the spread of ideas and also permits rapid feedback within the community. Moreover, in social media influential and/or trusted publishers and other participants in the conversation can lend their weight to the veracity of the postings of other publishers, via links, comments, voting and the like. In the blogosphere, for example, an influential blogger can include links in a posting to other blogs, which increases the influence of the linked blog post on a discussion.

One aspect of social media is that it is highly conversational in nature. As used in this patent application, an individual conversation in social media is a networked discussion about a specific topic between social media publishers. A conversation can also include an interaction between at least one social media publisher and conventional online media, such as an online news source like CNN. A conversational network is comprised of the individuals, sites, and pages participating in online discussions about all topics. A conversation within the network is about a specific topic. An individual publication corresponds to a post that is a single piece of media that can be located by a permalink and which may also contain additional links. An individual publisher is a person or entity that posts social media (e.g., the person or entity associated with one or more permalinked posts).

FIG. 1B illustrates a hypothetical example of how a conversation can flow within social media and also interact with conventional online mainstream media and corporate media. In the example of FIG. 1B, an illustrative example is that of a problem with a laptop battery. In social media the links between publishers within the social network permit different publishers to post Web content, provide comments, and post links. As a result, a conversation about a topic can flow and be amplified through the social media and also interact with conventional online media. In the example of FIG. 1B, a publisher in a social network 150 can vouch for the veracity of a posting of a blogger 152, increasing the level of trust in the story posted by blogger 152. Blogger 152 can include a link to another site, such as a media sharing website 154 having a video clip of the laptop battery problem and also to a corporate media website 153 having additional information about the problem. An online forum 156 may have a favorable comment about the video clip and include a link to the media sharing website 156 along with another link to mainstream online media 158 posting the same clip. In this example, a Meme aggregator 166 may also have a link to online mainstream media 158. In the example of FIG. 1B, some of the aspects of trust relationships can be observed such as publishers making comments supporting the veracity of the postings of others, publishers making comments to correct errors, and publishers providing links to other publishers within social media and to conventional online mainstream media 158 and corporate media 153.

Conventional Internet search tools have proven inadequate for examination of conversations within social media in terms of understanding the interactions within a dynamic conversation. Conversations in social media can propagate and amplify with astonishing speed. However, the information destination-oriented implementation of conventional Internet search engines does not permit many characteristics of conversations in social media to be adequately understood.

A traditional Internet search engine has a crawling strategy for indexing a broad cross-section of the Internet likely to be of interest to general purpose users. Search engines typically generate results for a query that are described as relevant based on the search criteria and distributed on a curve from "most relevant" to "least relevant," which can be drawn on a relevancy curve, as in FIG. 1C. Thus as a hypothetical example, consider again the example of FIG. 1B. If a user inputs a search query into a conventional search engine with query terms "Apple Laptop Exploding" they might receive 500,000 hits ranked by relevance. A conventional search engine would present a relevant result by seeking pages on which the search term occurs most frequently and also take into account some other relevance factors to rank the hits. Google's Page Rank algorithm, for example, concatenates the number of sites pointing to each page with relevant search terms to identify the site most pointed to by the greatest number of sites with high numbers of inbound links, using those pointers as a proxy for reliability of the data on the page. If so many other sites point to the page, it must be the most correct result for the search, the reasoning goes. This approach skews results to the top of the power curve in FIG. 1C giving sites that produce large numbers of articles and which are pointed to by other sites a disproportionate influence on the results, often long after the site stops producing new relevant content. Thus, for example, referring again to the hypothetical example of FIG. 1B, a conventional search engine might give a disproportionate relevance to old articles about laptop batteries.

Another problem of the conventional search engines is that they can be gamed. Consider, for example, the Google search engine. Google is primarily a ranking of web pages based on volumetric analysis. Google's Page Rank calculates the rank of information on a page in response to a search query by concatenating the number of explicit links from other pages associated with the search topic to an undisclosed number of degrees (pages pointing to other pages through a Uniform Resource Identifier, or "URI"), the concept of authority in information has been built on the volumetric notion that the greater the number of links pointing to a given page the more likely it is to be correct. This approach can be gamed by launching sites that point to a page in order to raise its authority (hence, Google must constantly adjust its indexing algorithms to prevent gaming) and suffer from historical skewing-sites. Volumetric determination of authority is prone to many errors and can be skewed by many factors that do not contribute to the user's understanding of how the information reached its current form and authority.

There are various modifications of conventional search engine technology that have been proposed. For example, search engines have been developed which examine popularity of links by timeframe. Determining the popularity by number of links pointing at a page within a given timeframe, such as two week or a month from the current data, limits historical skewing. However, this improvement is still inadequate to understand a conversation in social media. The number of links within the given time frame may be general, including all links to a site, and topic-specific, including just links that deal with a target search phrase. As a consequence, sites which have general links will be over-weighted, and as a result will drown out topic-specific conversation.

Conventional search engines also have another limitation in that they typically do not completely index social media. That is, the index in a conventional search engine does not capture sufficient information to properly represent and/or analyze a conversation. Conventional search engines are designed as general purpose engines to search the entire Web and have crawling policies that typically do not adequately index social media. One limitation is that conventional search engines rely on crawling of sites directly or capturing new information via Really Simple Syndication (RSS) feeds to generate indices, which limits the reach of search in several important ways.

First, one limitation of conventional crawling is that recency overwhelms context. No Web index is complete, the best represent perhaps 20 percent of the information on the Web, because the contents of pages must be captured by crawling sites from home page through the last archive page in order to be comprehensive. Because of limited resources and the more general focus of most search indices, crawls tend to cover only a part of the total contents of many Web sites; a crawler, for example, may only look at pages that are three pages below the home page of a site. Since the most recent information tends to reside on archival pages that may be more than three links deep on a site, a site's coverage of a topic will be judged only on the content of the most recent postings rather than the entire body of work the site represents, which underweights sites that are deeply focused on a few narrow topics, such as "IT Management" or "Legal Practice" when other sites become interested in those topics over a short period of time.

Second, another limitation of conventional crawling is that social media often limits the comments exposed through RSS, which means that conventional crawlers may not adequately index social media. In particular, few blogs expose their comments through RSS and those that do tend to separate the comments from the RSS feeds of main postings, eliminating or making far more difficult the analysis of comments in relation to topics discussed on the site. This undercuts the indexer's ability to track cross-linking of discussions within comments and minimizes the role of communities that exist around particular sites when measuring the discussion of topics.

Third, another limitation of conventional crawling is that there is a ping dependence. Indices that rely solely on RSS feeds depend on bloggers and publishers to "ping" the index server (that is, which send an Extensible Markup Language Remote Procedure Call (XML-RPC) command asking the index to review recent changes on the target site). Because there are many such indices and more appearing all the time, pinging has actually fragmented the market and forced search companies to form a coalition to share pings, distributing updated posting information to all members. Ping-based systems that are not supplemented by direct crawls of sites do not successfully capture all activity on and around sites in networked conversations.

The various drawbacks of conventional search tools severely limits the capability of individuals to analyze conversations in social media. At one level, conventional search engines will often produce too many hits. For example, a conventional search engine, such as Google, may produce millions of hits from a simple query in which a few search terms are input. On the other hand, a conventional search engine may fail to identify many web postings, due to the previously described problems associated with RSS feeds and the fact that conventional search engines index only a fraction of the Web.

An even more serious weakness of conventional search engines is that a conventional search engine does not provide information directly relevant to understanding the dynamics of a conversation in social media. In particular, the prior art search technology does not provide a capability to understand how conversations in social media are influenced and does not provide an understanding of potential trusted points of entry into a conversation.

Therefore, in light of the previously described problems, the apparatus, method, system, and computer readable medium of the present invention was developed.

SUMMARY OF THE INVENTION

A system analyzes social media, where the social media includes content posted in an online content universe distributed on the Internet. A conversation monitoring module monitors conversations in the social media, where an individual conversation is a networked discussion of postings published on the Internet for a particular topic. A social analysis module analyzes content associated with a conversation for social relationships indicative of the evolution of the conversation. In one embodiment the social analysis module includes an influence engine that determines the influence of postings in a selected conversation. In one embodiment, the influence engine determines the influence of postings and publishers who have multiple posts within a selected conversation. In one implementation a trust filter is provided to perform trust filtering of the online content universe and a conversation index is generated of posts published in the social media around trusted relationships.

One embodiment of a method includes generating a conversation index of posts published in an online social media around trusted relationships. The conversation index is analyzed based on a user-defined topic definition of a selected conversation, where the selected conversation is a networked discussion between social media publishers about a particular topic based on the user-defined topic definition. The influence of posts in the selected conversation is determined. In one embodiment, the influence of posts and publishers within the selected conversation is determined.

BRIEF DESCRIPTION OF THE FIGURES

The invention is more fully appreciated in connection with the following detailed description taken in conjunction with the accompanying drawings, in which.

DETAILED DESCRIPTION OF THE INVENTION

I. Introduction and Overview

Figure 1A:
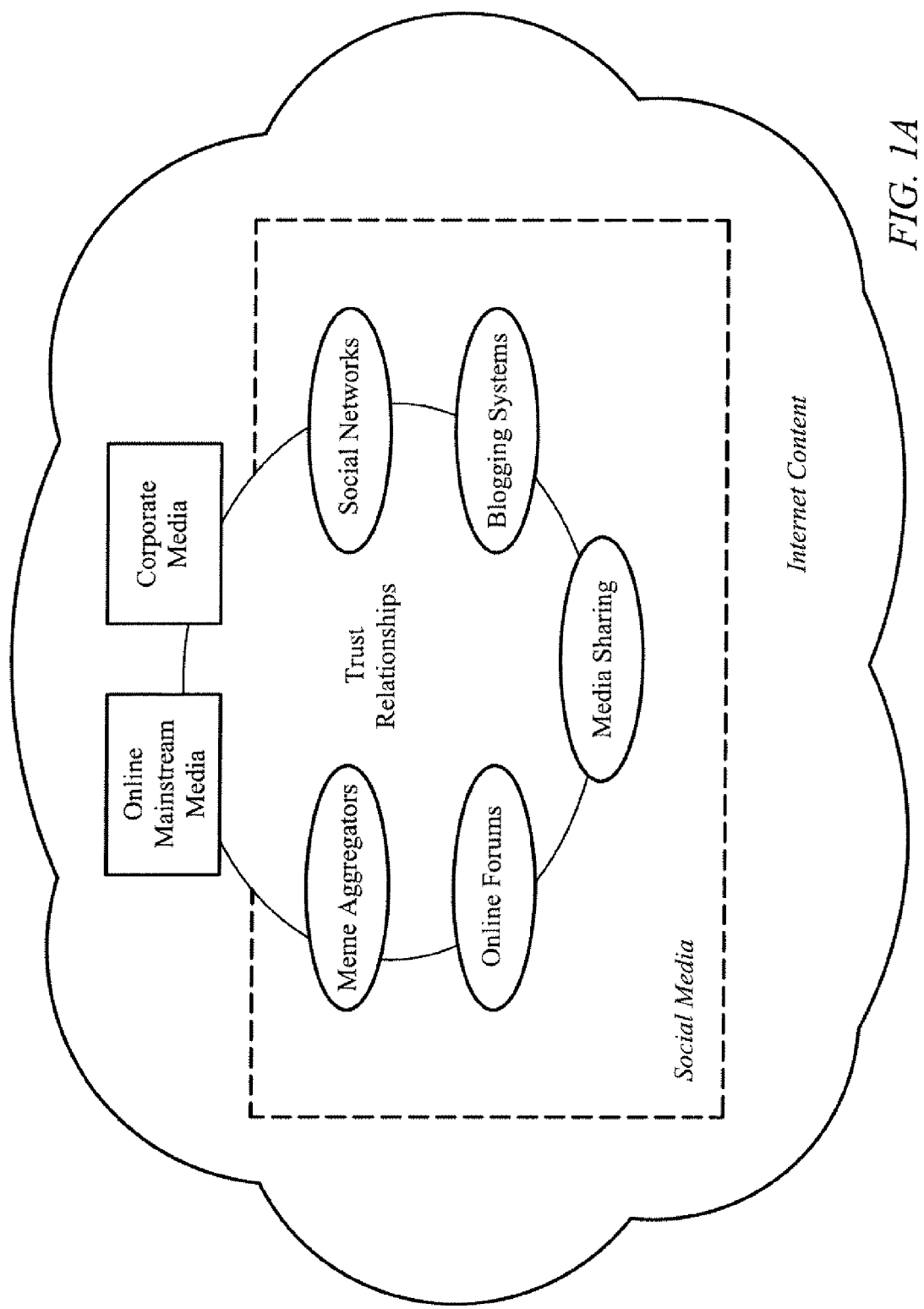
FIG. 1A illustrates social media types.
Figure 1B:
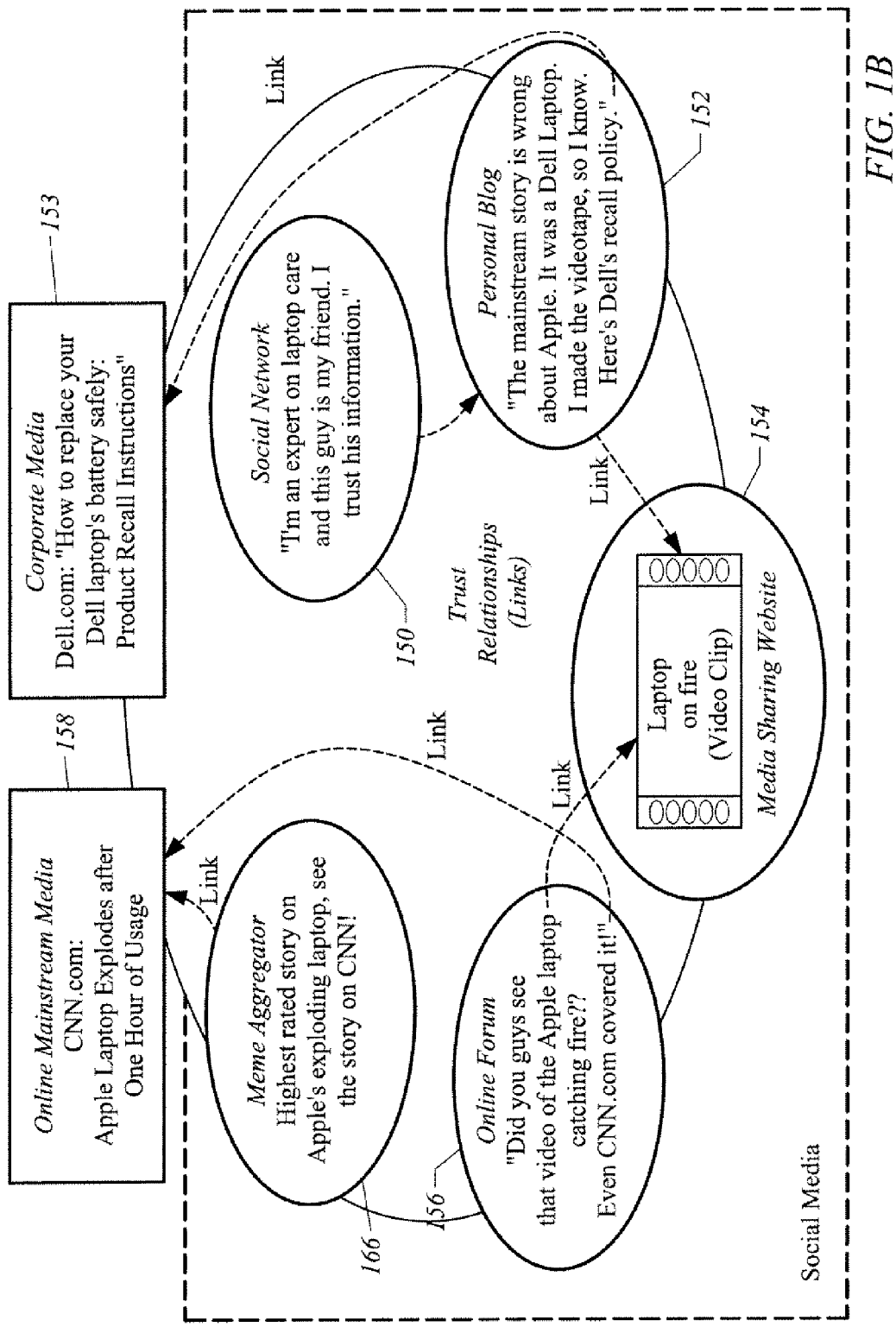
FIG. 1B illustrates the evolution of a conversation in social media.
Figure 1C:
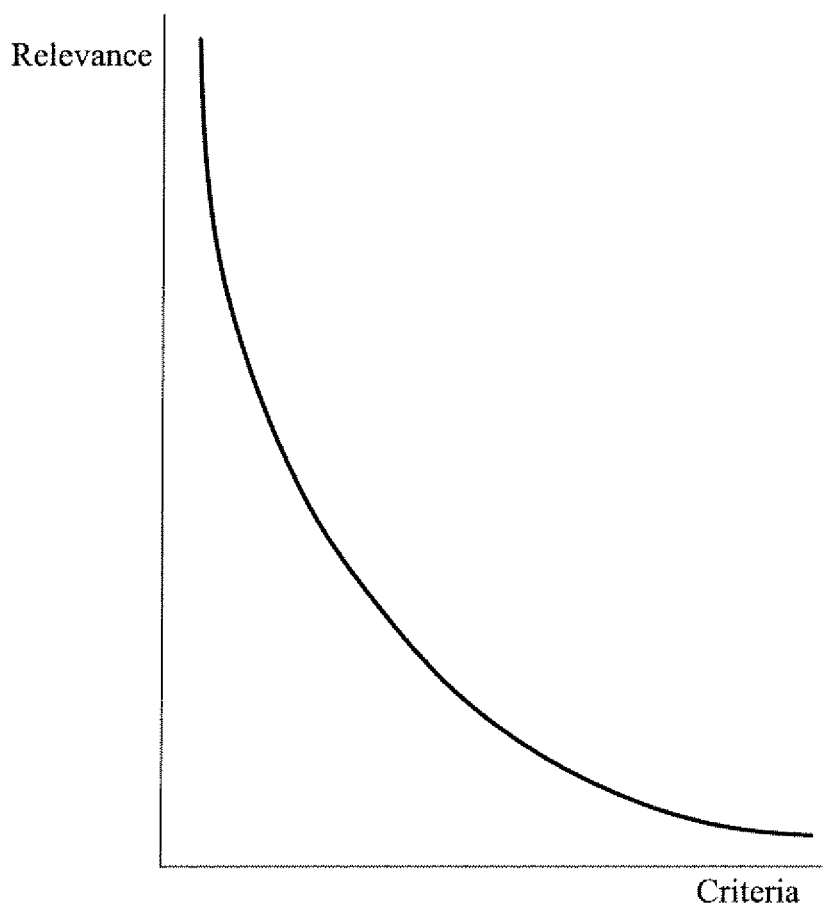
FIG. 1C is an x-y relevance curve describing search results of a conventional search engine.
Figure 2A:
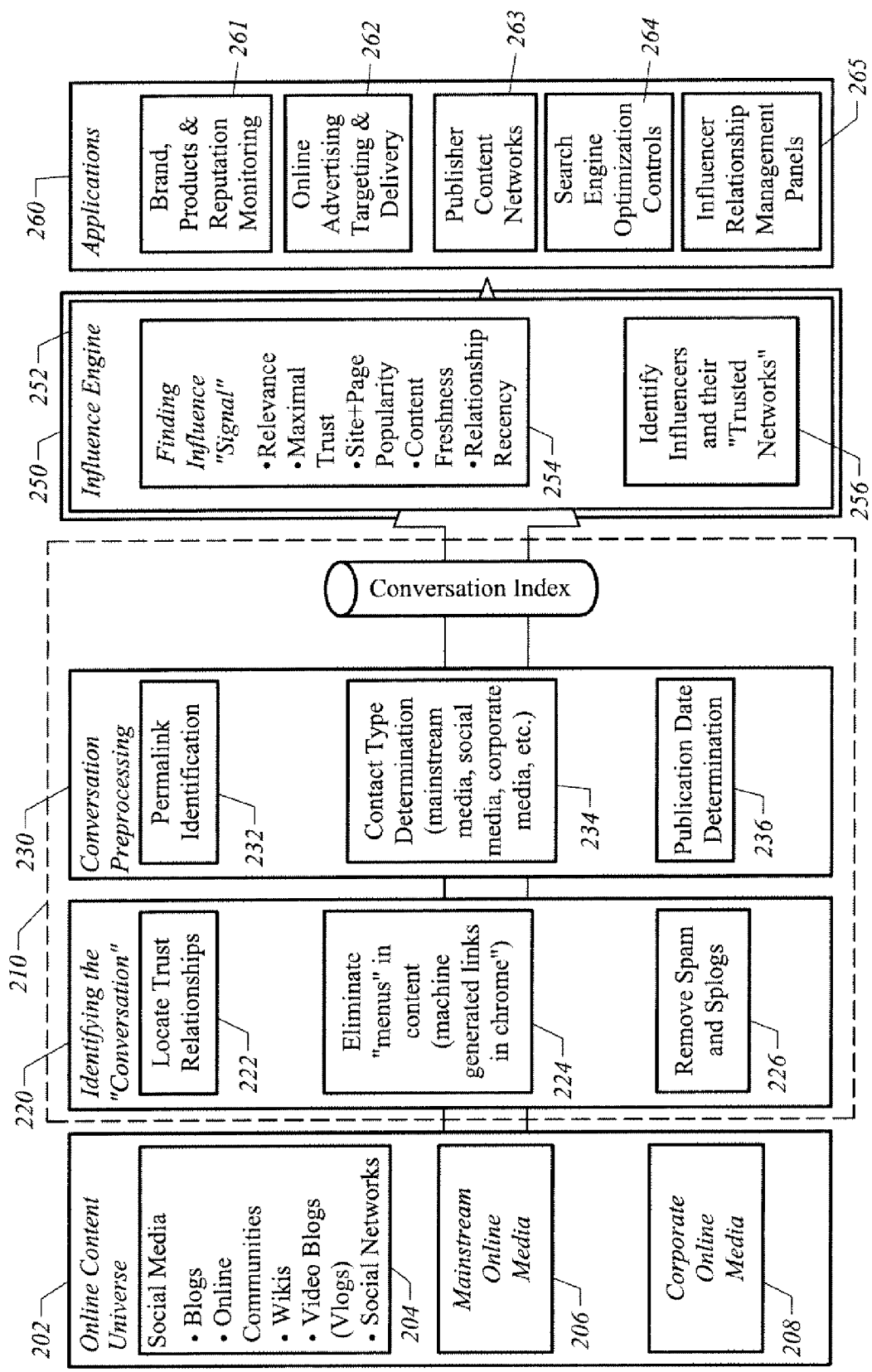
FIG. 2A illustrates a system for monitoring and analyzing conversations in social media in accordance with one embodiment of the present invention.

FIG. 2A is a block diagram illustrating a system in accordance with one embodiment of the present invention. A conversation monitoring module 210 monitors an online content universe 202 which include social media 204 and which may also include conventional online content, such as mainstream online media 206 and corporate online media 208. In one implementation, conversation monitoring module utilizes a crawler (not show in FIG. 2A) to monitor the online content universe 202, as described below in more detail. One aspect of the conversation monitoring module 210 is an identification module 220 to identify a conversation by, for example, providing sub-modules for locating trust relationships 222, removing spam and splogs 226, and eliminating menus in content 224. A conversation processing module 230 includes sub-modules for permalink identification 232, publication data determination 236, and content type determination 239. A conversation index 240 is generated of postings within the social media, where individual postings have associated permalinks. Over the course of time, individual publishers, such as individual bloggers, may have many postings indexed in the conversation index. A social analysis module 250 includes an influence engine 252. The influence engine 252 includes sub-modules to find influence signals 245 and identify influencers and their trusted networks 256. An individual influencer corresponds to an individual posting, although it will be understood that a particular posting also has an associated publisher, publication site, etc. which over time, may contain multiple influential postings within a certain conversation. An individual posting may also correspond to one or more Web pages.

Determining factors that influence a conversation is useful in many contexts. The output of the influence engine may be used for different applications 260 such as a brand, product and reputation monitoring application module 261; online advertising targeting and delivery application module 262; a publisher content network application module 263 to enable a user to navigate between influential pages based on a set of influencers and publishers about a specific topic as determined by the influence engine; a search engine optimization controls application module 264; and influencer relationship management panels application module 265.

Figure 2B:
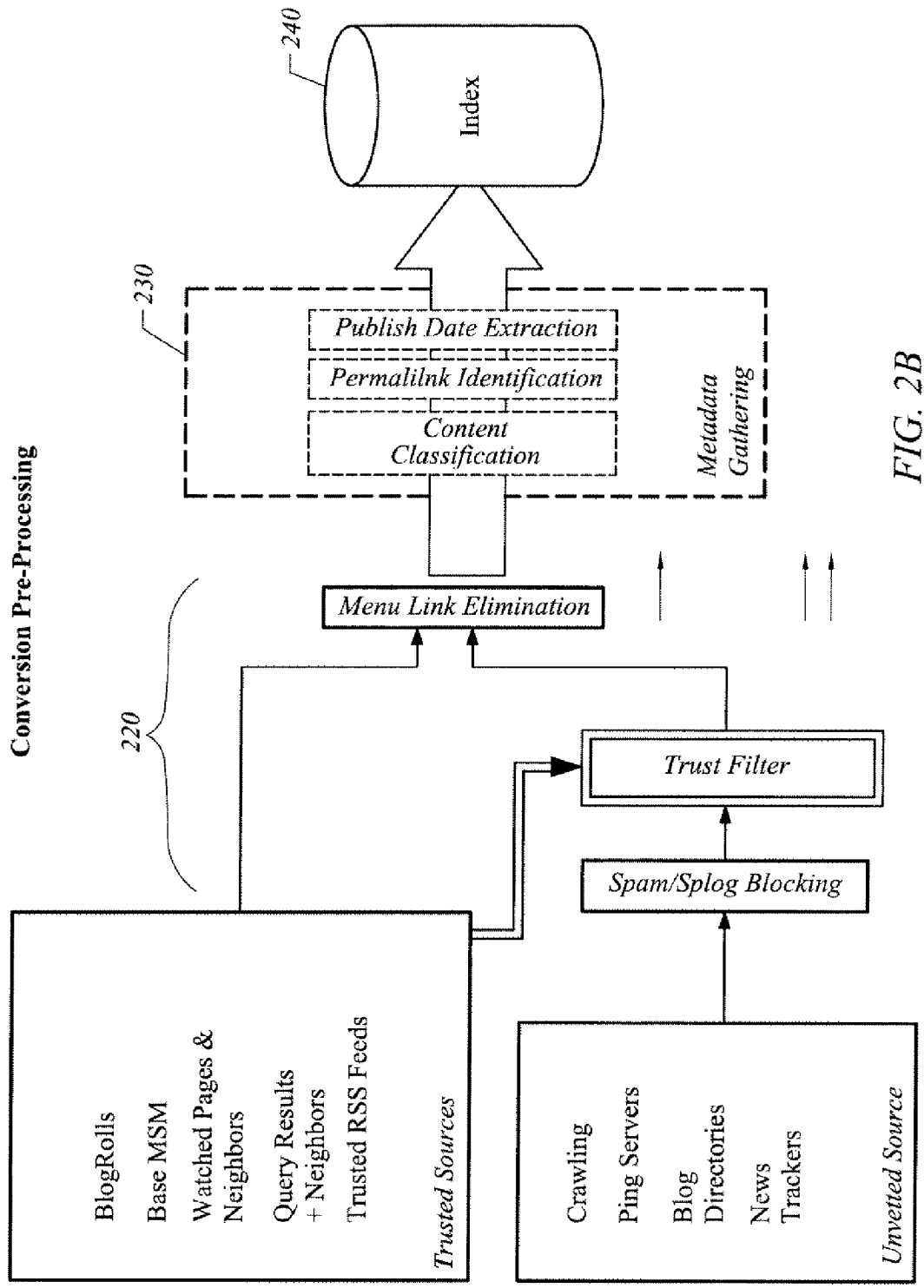
FIG. 2B illustrates conversation processing in accordance with one embodiment of the present invention.

FIG. 2B illustrates in more detail aspects of the conversation monitoring module 210 related to conversation pre-processing. In one embodiment, conversation processing module 230 implements content classification, permalink identification, and publication date extraction. The gathered metadata is then stored in conversation index 240. Data may come from trusted sources, such as long-time bloggers. However, note that for un-vetted information sources that an initial stage of spam/splog (spam blog) blocking is performed to filter out spam and splog. A trust filter in sub-module 222 verifies that the content which is indexed is consistent with the content originating within one or more networks of trusted relationships between publishers in the conversation index. In particular, the trust filtering may examine the content for one or more cues that indicate that the content is consistent with a trust relationship network. In one embodiment, a trust filter makes filtering decisions based on a criteria related to whether or not the linking behavior is consistent with the type of linking behavior normally observed in trust relationships. For example, a decision not to filter an un-vetted post may be based on discovering a pre-selected number of links from trusted posts to an un-vetted post. In other words, it is desirable to filter out content which has one or more indicia that indicates that it is not consistent with a trust relationship in social media. For example, in the case of blogs, empirical studies of blogs may be performed to determine indicia that a blog is part of a trust relationship network and not a posting arising from a malicious, deceptive, or untrustworthy source. As the Internet constantly evolves over time it will be understood by one of ordinary skill in the art that trust filtering requires empirical study to adapt a trust filtering algorithm to changes in Internet usage over time to distinguish "normal" posting behavior in a trusted network from other types of postings which cannot be trusted. Note that in one embodiment historical data may be maintained on the credibility of individual publishers over time. The combination of blocking spam/splog and performing trust filtering improves the quality of the content that is indexed.

In one embodiment, a particular conversation is identified based on a user-defined input topic/target. As an illustrative example, in on embodiment a set of keywords, Boolean operators, and a URI (or set of URIs) may be input by a user to define a topic of a conversation that a user wishes to explore. A search is then performed of the conversation index, where the conversation index is a searchable index of web conversations that includes topical information, such as relevance; and relationships between publishers, such as relationships between corporate sites, social and mainstream media. The conversation index 240 accounts for implicit and explicit web user actions which drive the influence of social media posts and publishers. The influence engine 252 calculates influence in social media networks based on various factors, such as relevance, occurrence, attention, popularity, and traffic. The results may, for example, be used to determine a ranking of influencers for a specific conversation, a social map that is a visual representation of relationships between posts and other participants within a conversation, a neighborhood of relationships around a social media post, or other outputs.

Figure 3A:
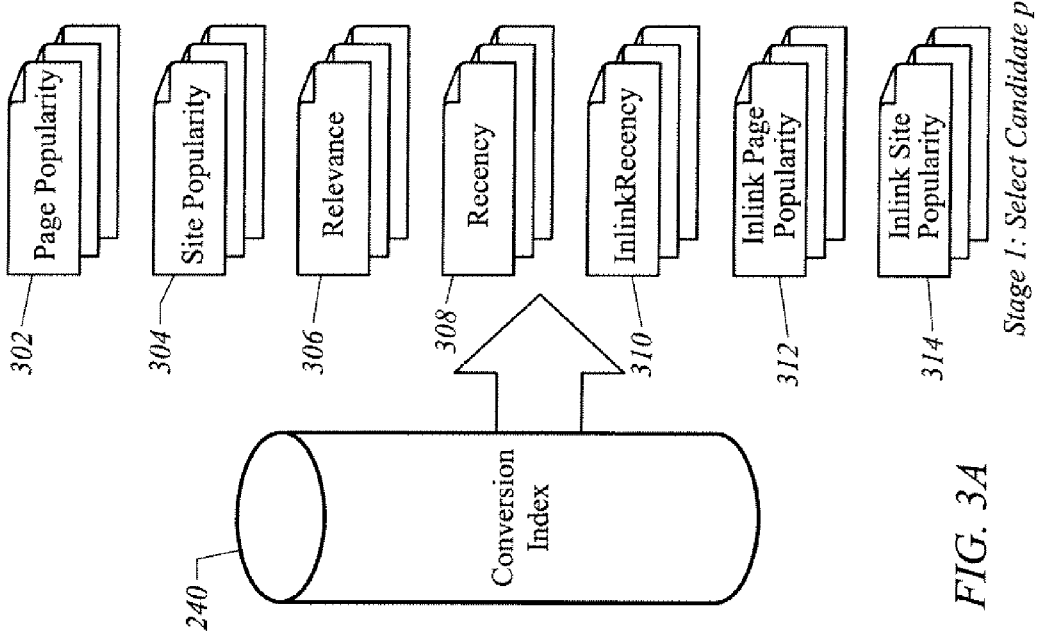
FIG. 3A illustrates a process for determining influencers in a conversation in social media in accordance with one embodiment of the present invention.

FIG. 3A illustrates an example of a process that influence engine 252 implements to analyze influence and determine a list of influencers for a specific conversation. In a first stage, the influence engine 252 selects an initial candidate pool of documents for a conversation, with each document having an associated publisher. In a practical application, the conversation index may contain a large number of documents that are relevant based only on keywords and Boolean operators. The influence score is computed 316 using a selected set of dimensions, using a weighting function to add additional dimensions in addition to relevancy. In one embodiment at least seven dimensions are examined, including page popularity 302, site popularity, 304, relevance 306, recency 308, inlink recency 310, inlink page popularity 312, and inlink popularity 314. An inlink is an inbound link to a post in social media. From the influence score, a list of influencers 318 for a specific conversation is generated. Depending on the application, the output can include a list of publishers along with the documents having the maximal influence. As described elsewhere in this application, other modifications include generating other types of information based on the influence scores, such as changes in influence over time. For example, there are many applications where it is useful to identify those contributions to online discussion, whether blog postings, articles in the media or Web sites that are changing the nature of the discussion by: a) introducing new topics or interpretations of topics that may alter impressions of a product/service/candidate; b) gaining or losing support in the discussion over time, which will ultimately reflect in changed search results at some future date and, therefore, could alter perceptions of a product/service/candidate; and c) seeking communities of interest that, if combined, rapidly transform the influence of their individual perceptions and velocity with which those ideas travel across the Net.

Figure 3B:
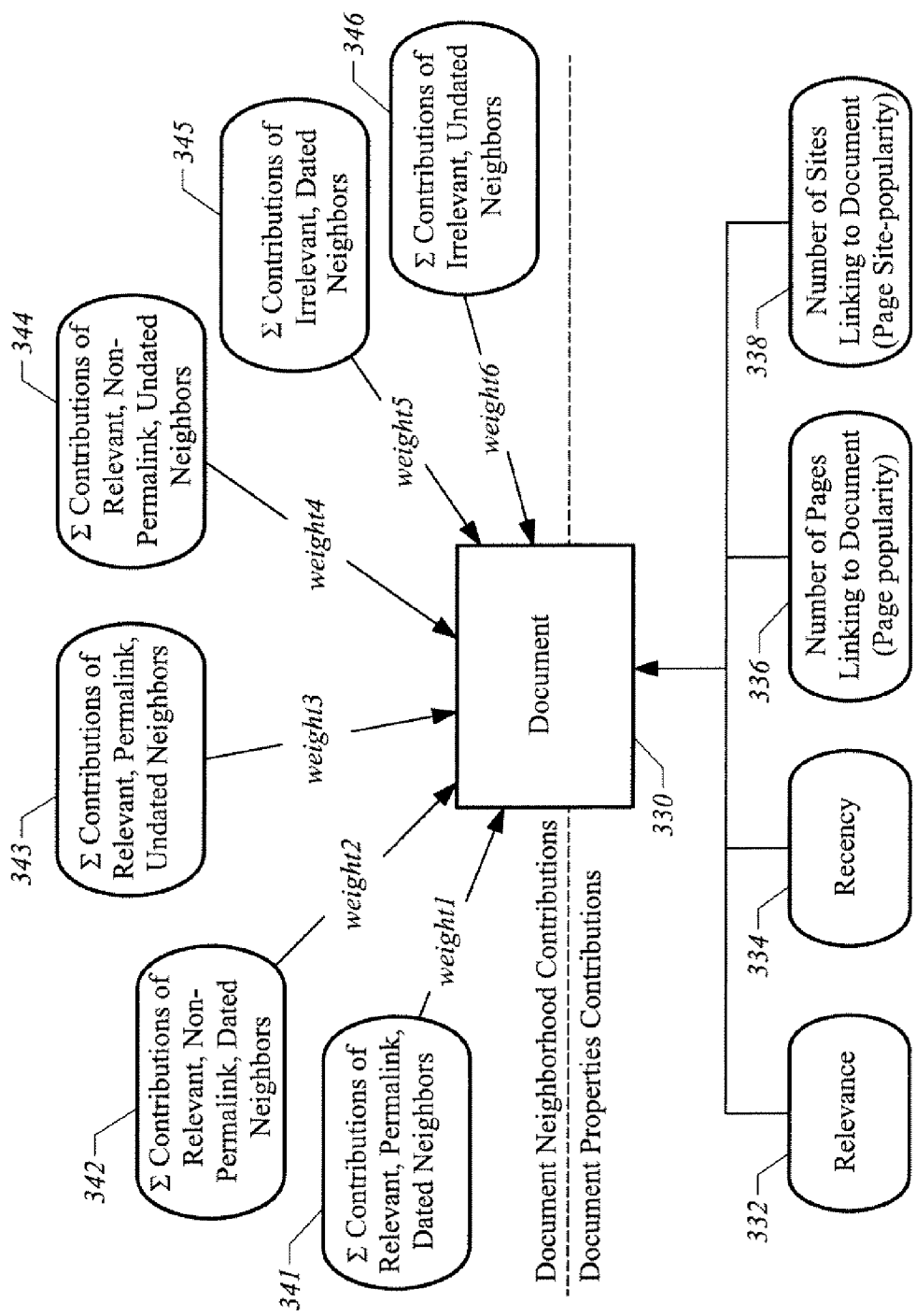
FIG. 3B illustrates a process for determining the influence score of an individual document based on attributes of the documents and neighboring documents in accordance with one embodiment of the present invention.

FIG. 3B illustrates additional aspects associated with computing influence of a document in accordance with one embodiment of the present invention. In one embodiment the influence of a document is calculated based on two different aspects. First, one aspect of the influence of a particular document are properties directly associated with the document, such as relevance 332, recency 334, page popularity 336, and page site popularity 338. Another aspect of the influence of the document are aspects of the document's neighbors, where a neighbor is either documents that directly link to the document being considered for influence or links to a document through intermediary links to the document being considered (up to a pre-selected number of intermediary links, such as up to four links distant from the document). The final influence score of a document is based on two scores, a first score that weights different contributions of attributes of the document and a second score that weights contributions of neighbors.

In one embodiment, neighbors are assigned to groups based on attributes such as the relevancy of a neighbor (relevant/irrelevant), permalink/non-permalink, and dated/undated. Within a group of neighbors, contributions are summed to generate a group value. In one embodiment, the contribution of each neighbor to the influence of the document is based on contributions of relevant permalink dated neighbors 341, contributions of relevant non-permalink dated neighbors 342, contributions of relevant permalink undated neighbors 343, contributions of relevant non-permalink undated neighbors 344, contributions of irrelevant, dated neighbors 345, and contributions of irrelevant, undated neighbors 346. The contribution of each neighbor to a group sum is a function of the neighbor's relevance, its own page popularity and page-site popularity, and may also include the recency of the neighbor. A time decay function may be used to reduce the contribution of older content of neighbors based on publication date. Neighbors in a group may be grouped secondarily by a site identification with a "same site decay" function applied to their contributions to reduce the contribution of large quantities of links from the same site (large numbers of machine generated links do not reflect trust relationships and hence should be given little weight). The same site decay function may also be applied to document sorted descending by their recency and page popularity to ensure that the most recent and popular neighbors from the same site contribute the most to the final influence score. A weighting function is used to weight the contributions of the neighbors and from the aspects of the documents itself to determine a raw influence score for the document. When all candidate documents have been assigned a raw influence score, a normalized influence score is computed for all documents.

Additional aspects, embodiments, and benefits of the present invention will now be described in more detail in the following sections. It will be understood by those of ordinary skill in the art throughout the following sections that the discussions refer to different implementations and applications of the previously described system as additional examples for the purposes of illustration and description.

II. Dynamic Analysis of Influence

One aspect of the present invention is that the influence of different documents/publishers can be quantitatively measured and compared and analyzed versus time. Influence can be measured for an individual post of a conversation. For example, an individual can make a one-time post and the influence of the post on a conversation measured. Additionally, aspects of the influence of a publisher who has made a number of posts about a certain topic can also be measured.

Figure 4A:
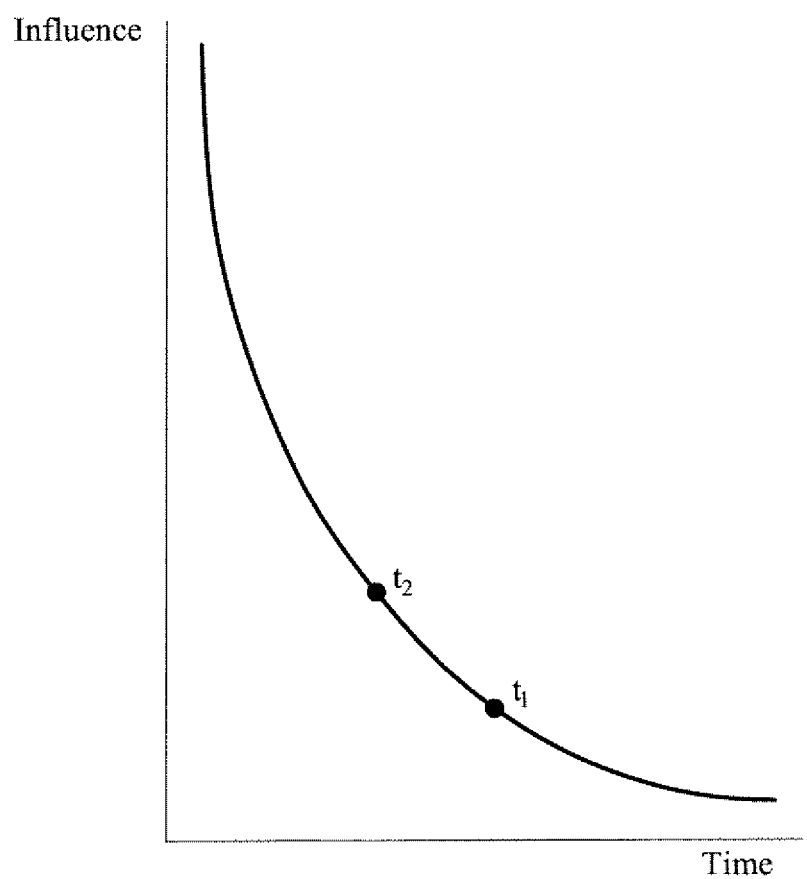
FIG. 4A illustrates an x-y curve displaying influence of a single network post or publisher at time 1 and time 2.

One aspect of the present invention is that influence can be measured over time. As illustrated in FIG. 4A, the difference in influence at time one ($t_1$) and time two ($t_2$) allows the present invention to track the changing number of connections around a particular idea, as expressed in text on a Web page or, through language processing systems that may be connected to the system, such as audio and video sources. Over time, this allows the system of the present invention to single out sources whose influence is waxing or waning, allowing applications 260 to choose when and where to engage the conversation. For example, objective criteria may be selected, such as a threshold level of influence or a rate of change of influence. This permits a decision to me made when and where to engage the conversation. For example, an influential publisher and a time for engaging the influential publisher may be identified. Conversely, the objective criteria may be utilized to make decision not to engage a conversation, such as if influence in a conversation begins to decrease.

Figure 4B:
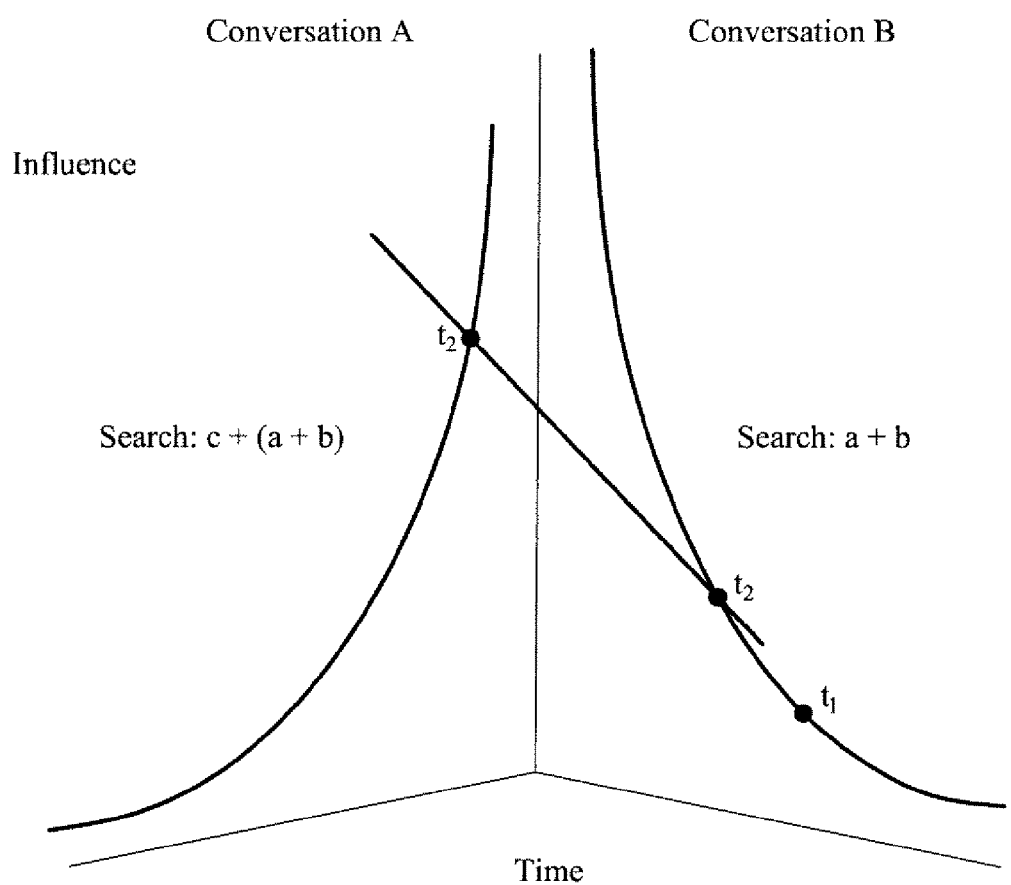
FIG. 4B illustrates two x-y curves displaying the influence of different networked conversations at time 1 and time 2.

The present invention can also be extended to support more advanced techniques of influence analysis. In one embodiment multi-dimensional tracking is supported. In this embodiment the system also views the market in many dimensions rather than as one topical vector defined by a single search parameter. This provides deep insight into how, when two complementary conversations intersect in a single blog posting, article or other Web site, they can suddenly accelerate dramatically by achieving a geometrically larger audience through a mathematically expanded discussion. In FIG. 4B, two different conversations are being tracked. They are about different topics, "a+b" and "c," until time two (02), when Conversation A adds the topic in Conversation B to its text. This happened in summer 2005, when blogger Jeff Jarvis, who blogs often on the fact that bloggers are not taken seriously when they criticize companies (in this case, the argument "c," which is a frequent topic of discussion among bloggers) linked the idea to his personal complaints about the lack of customer service support from Dell Computer ("a+b"). The conversational momentum increased at time 3 ("$t_3$" in FIG. 4C), leading to significantly more linking between sites discussing Dell, blogs and the media.

Figure 4C:
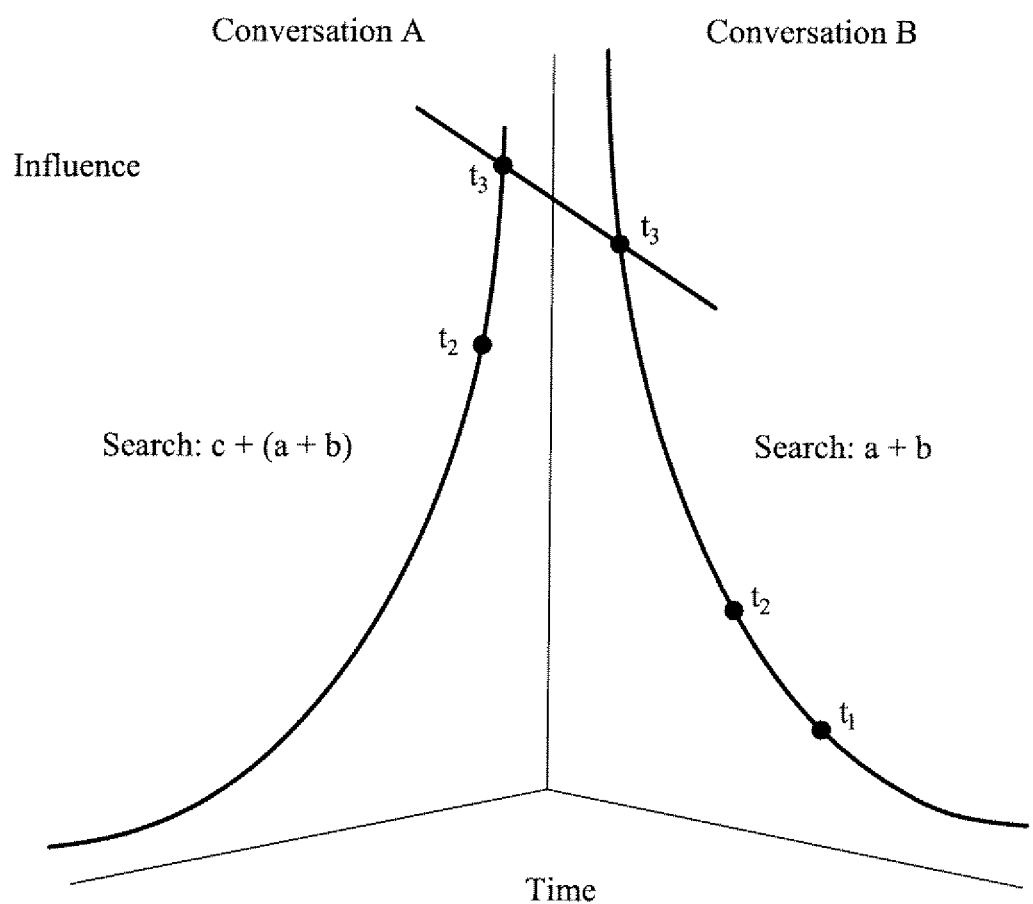
FIG. 4C illustrates two x-y curves displaying the multiplying effect of cross-linking between two discussions displayed in FIG. 4B at time 3.

One embodiment of the present invention supports predictive analysis. The ability to identify emerging communities of discussion gives the present invention a unique capability to generate predictions of the velocity and influence of ideas and individual contributors in a current discussion using variables entered into what-if scenarios by an end-user. This embodiment provides if-then scenario-building features that allow users to examine how social networks may be expected to behave based on previous behavior and the potential impact of topic crossover as illustrated in FIGS. 4A, 4B, and 4C.

Figure 5:
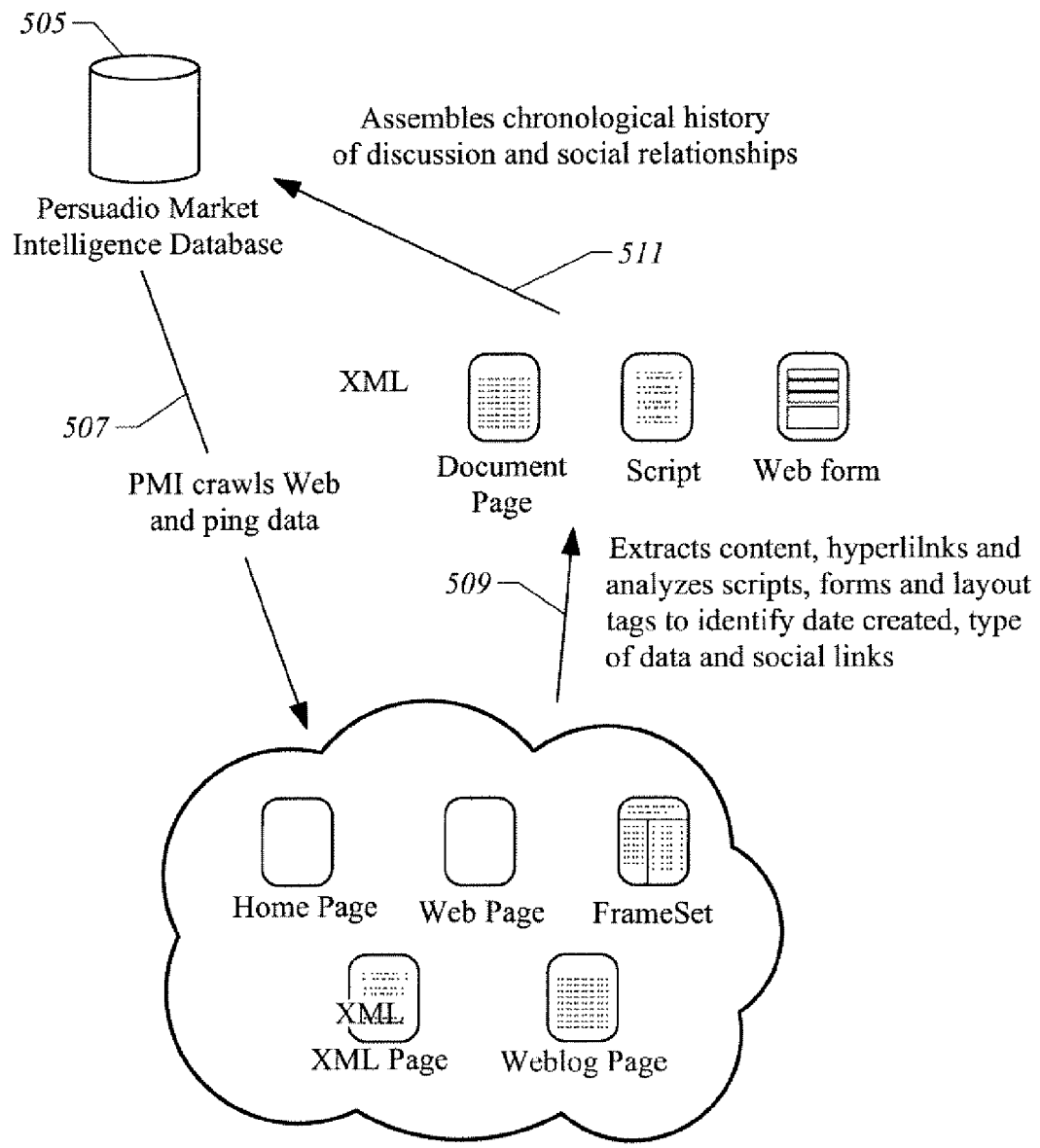
FIG. 5 is a diagram illustrating extraction of information form social media in accordance with one embodiment of the present invention.

In one embodiment, retrospective crawling is supported. FIG. 5 illustrates in more detail an example of a process that may be used to assemble a chronological history of discussion and social relationships 511 for conversation index 240.

In this example, a "Persuadio Market Intelligence" (PMI) system 505 crawls Web and ping data 507. The system 505 is used to extract content, hyperlinks, and perform additional analysis, such as analyzing scripts, forms, and layout tags to identify data created, the type of data, and social links 509. As illustrated in FIG. 5, the content of individual sites is examined to distinguish when information appeared, what format it was produced in (e.g. blog posting, news article, comment about an article or blog posting), and construct a navigable history of social exchanges within the data. Relationships between people and organizations that created the data are reconstructed revealing how ideas flowed between different sites, were amplified by individual participants and what changes in perception were reflected in discussions of the target topic.

One embodiment of the present invention permits conversations in social media to be analyzed in ways not possible with conventional Internet search engines. Prior art search and blog monitoring tools focus on historical displays of the volume of discussion about a particular topic based on conventional relevance scores, which is typically presented only as a histogram. Search matches based solely on conventional relevance matching does not expose which participants accelerated a conversation or what pages/postings increased the number of sites in a conversation about the topic through linking and social influence. Historical data, particularly about the previous interests of participants and social relationships, provides the foundation for extrapolating future behavior as well as records of the role of influencers in commercial brand perception.

Unlike traditional search engines, one embodiment of the present invention does not treat the whole Internet as a set of documents ranked on a single power curve. Instead, it dissects conversations based on a topic. Additionally, conversations may be dissected based on existing social relationships based on historical data, and the component elements of documents and authors it is tracking to produce a more refined power curve that includes relevant sites, which can be described as an "attention lens." For example, conversations may be going on about "road taxes in Lakewood," which could refer to any number of cities in different states—none of the conversations is relevant to the others, but they are treated as a single subject by traditional search engines. By isolating the specific Lakewood through a calibration process that produces an initial attention lens, including analysis of the location of participants sites, the language of the postings, the names of key players in the conversation, and the expansion or contraction of link relationships over time can provide a very granular view of the influence within that discussion.

As sites and documents join or leave a conversation, they can be filtered by the linking of sites in the attention lens to reflect the changing velocity and reach of the conversation. A conversation expanding rapidly, either in terms of participants joining or the frequency of postings on the target topic, has an increased probability of spilling over into other communities to become prominent subjects of conversation. One embodiment of the present invention thus monitors not a single power curve summarizing the whole conversation about all topics taking place on the Net, but instead identifies many small power curves, tracking the activity of each conversation discretely and cross-over between conversations over time to provide useful explanations of why conversational patterns, influence and reach are changing.

Another embodiment of the present invention supports the capability to examine discussions longitudinally, even retrospectively by extracting time/date information from archival content, so that benchmarks of influence may be established against which future conversational reach, velocity and influence may be measured. Through repeated crawls, the changes are sought in the amount of influence individual postings and articles have within discussions, providing extensive insight into what individual participants care most about, what they are likely to respond to and the probability that they may be drawn into discussion about a particular topic.

Unlike other search engines and blog monitoring services, an embodiment of the present invention provides users the ability to reconstruct the history of a discussion from existing postings. In one embodiment the system's search features and Hyper Text Markup Language/Extensible Markup Language (HTML/XML) parsing capabilities allow it to extract a hierarchy of information about each document a crawl finds, including the domain, site, page, posting body and time-created, as well as individual comments that may appear on a page of text, whether a blog or a news story which includes a discussion thread. The system breaks down the components of the page based on when information was added, providing a threaded view of conversations within a single site and across multiple sites. Even where there are no explicit connections between sites, the system's ability to examine when ideas entered conversations allows for analysis of un-attributed influence (e.g., a quoted passage that appears on a second site without a link to the source site).

Additionally, unlike a conventional search engine, one embodiment of the present invention begins with a conversation index 240 optimized for searching conversations in social media. As previously described, the conversation index of the present invention preferably utilizing trust filtering to improve the quality content within the conversation index. Additionally, as described below in more detail, in one embodiment of the present invention additional variations on conventional crawling techniques are supported to index comments and other aspects of conversations which are not typically indexed by conventional search engines.

III. Trusted Network Analysis and Social Analysis Metrics

As previously described, the Social Analysis Module 250 utilizes tools to analyze a conversation. These tools utilize various definitions based around an understanding of a social network having trusted relationships, which will now be defined in more detail. It will be understood by one of ordinary skill in the art that for a particular implementation, the definitions may vary from those described below, which are merely exemplary. However, what is important is the recognition that social analysis metrics may be developed based on an understanding of a social network which permits aspects of a conversation in social media to be objectively quantified and compared to determine key influencers and other aspects of the conversation.

Figure 6:
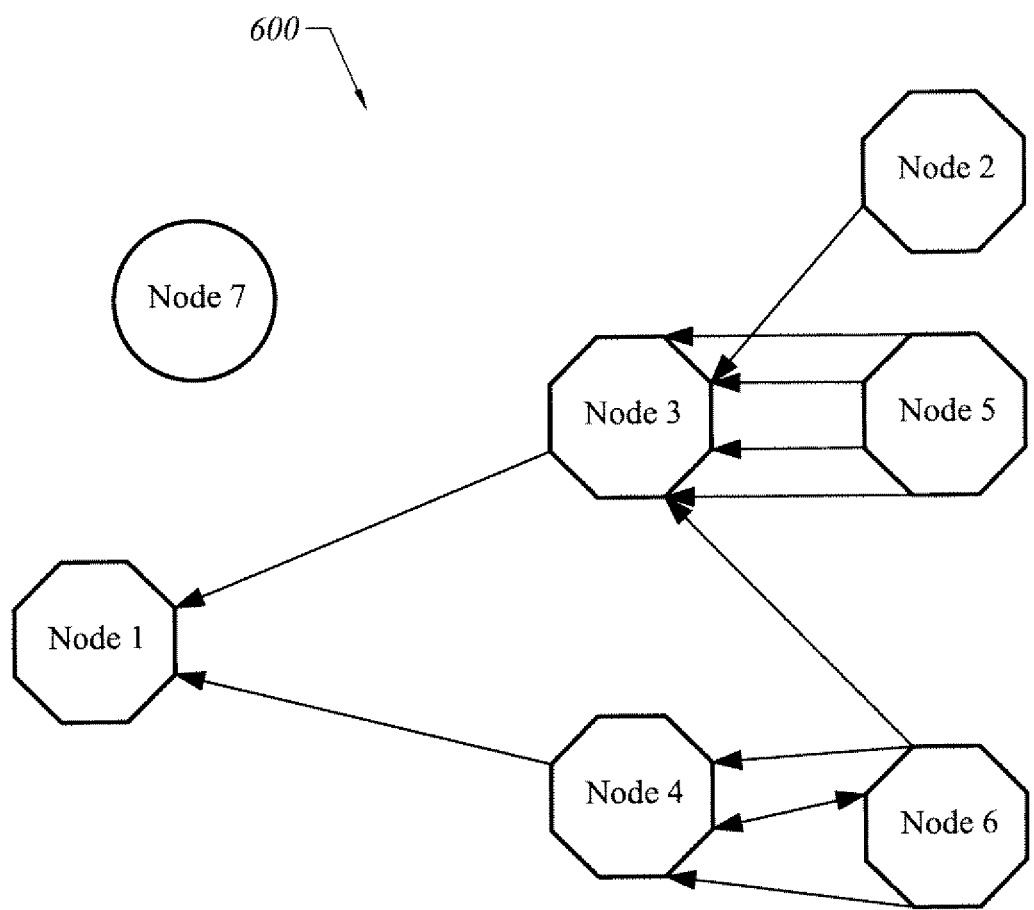
FIG. 6 is a network diagram illustrating the concepts of social degrees, strength of relationships and multi-variable social relationships in accordance with one embodiment of the present invention.

FIG. 6 illustrates a social network 600 having nodes 1, 2, 3, 4, 5, 6, and 7. The links between nodes are illustrated by arrows. As illustrated in FIG. 6, social network relationships have a directional sense, social degrees, strength between nodes, and multi-topic social relationships. Social networks are made up of links by one site to another. An individual story, may for example, propagate and be amplified (or diminished) through a sequence of nodes based on the social relationships between the nodes. An individual node corresponds to social media posting at a site where social media is posted (i.e., permalinked pages) and may have a variable number of links with other nodes. That is, the social media is posted on networked permalink pages. The links may be one-way or two-way. Additionally, an individual node, such as node 7, may have no links, and hence no social relationships. The strength of a relationships at a node will depend on the type of link, in particular whether the link is a one-way or two-way links with other nodes; and the number of links (i.e., multiple links indicate a stronger relationship than a single link). Additionally, topic relevance is an aspect of the social network. An individual site may discuss several different topics, as represented by the faces of the octagons, such that FIG. 6 represents a multi-topic relationship. In a multi-topic relationship, opportunities exist to bridge communities with separate interests and shared goals.

The social network illustrated in FIG. 6 is a useful starting point to understand different ways that the relationships can be characterized. Characterization of the relationships, in turn, may be useful to identify indicators of a trust relationship and/or a trusted network. As previously described, social media tends to foster trust relationships in which content is self-correcting. For example, blogs with an audience are a priori relatively expert in the areas being linked to and they in turn link to other blogs in the same area whose authors are also generally fanatical about stamping out misinformation. By the same token, good ideas presented in a blog tend to get amplified immediately due to the trust relationship. By carefully defining aspects of the relationships in a social network, such as that illustrated in FIG. 6, various attributes of trust relationships can be assigned definitions which permit influence and other aspects of the social network having trust relationships to be quantified and mapped.

An agent is a participant in a conversational exchange, which may be a person, a document or file stored on the Internet, or a document or audio/video record that can be analyzed to identify relationships and thematic influences. In FIG. 6, each node has an associated agent.

A degree is a unit of social measurement denoting a one-step connection between two agents in a network. First-degree relationships include all sites with a direct connection to a site; second-degree relationships are two steps from the central or target site in a social network analysis. In FIG. 6, node 1 has a first degree relationship with nodes 3 and 4. Node 1 has a second degree relationship with nodes 2, 5, and 6.

When used to describe computer-mediated social relationships a link is a hyperlink or other pointer embedded in the body of a Web site or page that can be followed, by clicking or activating the connection, by network users from one file or page to another on the network. When used to describe other social relationships, a link may be a spoken or written reference to another person or an idea, as expressed in text or in audio or video content.

Links have directionality. Some node relationships are one-way relationships in regards to how the nodes point to each other about a particular topic. For example, nodes 3 and 4 provide inbound links (inlinks) to node 1 and receive no links from node 1. Other nodes have two-way relationships. For example, nodes 4 and 6 have a two-way relationship because they point to each other's content about a particular topic.

There is a hierarchy of content. The system preferably delineates between files, articles and pages on a Web site or network server, including an individual posting on a Weblog or online journal, treating each as an individual component of the conversation ("hierarchy component") using a hierarchy of domains, sites, pages, posts, and comments. A domain is the top-level domain name of a site or network server, such as "blogger.com" or "buzzlogic.com," which may include many individual sites or blogs. A site is a unique network destination based on a URI with a sub-domain of the domain name (e.g. "blogs.buzzlogic.com") or a subdirectory that denotes an individual site or blog (e.g., "blogger.com/mitchblog" or "cnn.com/andersoncooper"). Pages are an individual document that is part of a site or stored on a network server identified by a URI describing the full path to the file. Posts are individual components of a Weblog or other display interface that displays multiple entries based on user identity, time of day or date. Comments are textual, audio or video responses attached to a page or post by visitors to a site, such as reader responses on a newspaper Web site or a Weblog.

Links are characterized as either outbound links or inbound links. An outbound hyperlink, network pointer or thematic reference in a recording or on a site, page, post or comment. A inbound link is hyperlink, network pointer or thematic reference in a recording or on a site, page, post or comment that indicates a relationship with the target site, page, post or comment.

Agents are characterized as either active or inactive. An active Agent is an agent or site currently engaged in publishing about a specified subject within a user-defined timeframe.

A social network analysis has a distribution of points in a map. A center can thus be defined as the target domain, site, page or post that defines the central point of a social network analysis or map.

The relevance of content can be defined by a focal exclusivity factor. Focal exclusivity is a value between zero (0) and one (1) that describes the relevance of a site, page, post, or comment based on the total number of matches to the search term(s) compared to other semantically important terms. It is calculated by extracting the search term(s) and other repeating terms in the target hierarchy component and dividing the number of occurrences of the search term(s) by the total number of semantically important repeating terms.

Relationships can be characterized by a social strength. The social strength is a value that describes the strength of the relationship between two sites, people or ideas, based on the number of one-way and reciprocal links that connect them. The social strength of a relationship may be displayed on a scale as part of an index of all social relationships or used to calculate the median or average strength of a social relationships maintained by the agent in order to assess the relative importance of individual relationships.

Relationships can be characterized by a social weight (influence). A social weight is a value that expresses the cumulative strength of all relationships a domain, site, page, posting or comment based on a calculation with a user-defined weight for each variable:

(sum(social_weight_of inbound_links)*user-defined weight[value=0>1]+count(inbound links)*user-defined weight[value=0>1]+count(outbound_links)*user-defined weight[value=0>1])+focal exclusivity*user-defined weight[value=0>1].

Content can be characterized by the degree to which it associates either a positive or negative characterization to the conversation. A tone factor can be defined as a value between one (1) and negative one (−1) describing the ratio of positive and negative terms associated with the target search term(s). Tables are maintained of positive and negative words for each workspace. Each positive word is counted as 1, each negative word is counted as −1. As a default, the sum of the values for the positive and negative words is found by searching each hierarchy component for all positive and negative words. This sum is then divided by the total words found to normalize the value to the range of +1 to −1. Proximity values, describing how closely search term(s) and tone terms co-occur, can be added to Tone.

A site can be ascribed a value indicative of the likelihood that the site will engage in a discussion. A susceptibility factor is defined as a value between zero (0) and one (1) that describes the likelihood that a site will engage in a discussion about the target search term(s) that is derived by the total number of occurrences of the search term(s)s and related terms divided by the total number of pages, posts or comments created during a user-specified timeframe.

The rate at which new agents join a calculation can be characterized. A velocity factor is a value between zero (0) and one (1) that expresses the frequency with which new agents are joining a conversation that is calculated by counting the total number of pages, posts or comments that match the search term(s), subtracting the previous crawl's total matches to arrive at the number of new agents.

In one embodiment influence is characterized by a value that expresses the conversational correlation between two or more agents about a specified subject. Influence may be calculated using factors such as relevance (how closely the text of a post by a publisher matches a user's query), occurrence (a count of the number of relevant posts published over time by a publisher), attention (a score of relevance, and recency of inbound linking to an item in the conversation); popularity (total number of inbound links), and traffic (score the number of web users referred to y influencers, the number of page views they accumulate, and/or other actions they take).

An influencer is defined as site, page or posting that has a social weight greater than the median for a selected population of agents. An influencer may or may not be related to target search terms, as some sites consistently lead the conversation by promoting conversation.

It is desirable to characterize how conversations are amplified. An amplifier is defined as a site, page or posting that has a first-degree outbound social weight (all other variables unweighted or "0" [zero]) greater than the median for a given target URI. An amplifier may or may not be related to the target search terms, as some sites consistently widen conversations by repeating messages. A topic Amplifier is defined as a site, page or posting that is an Amplifier (see above) and contains the target search terms and that repeats or points to the messages of an influencer.

Leadership can be defined. When describing the relationship between two agents, the leader is a site, page or posting that receives more inbound links. When describing the position of a site, page or posting within a selected population of agents, a leader has a Social Strength greater than the median Social Strength of the whole network.

A volatility factor can be defined. Volatility is defined as a range value (high=1; average=0.50; low=0) that describes the number of pages or posts a site during the user-defined; may be a literal number based on a user-defined scale or calculated by comparing the number of pages or posts on the target site to a median value for the sample population.

A topic volatility is defined as a range value (high=1; average=0.50; low=0) that describes the number of pages or posts a site publishes about the relevant search term(s) or related terms every 24 hours; may be a literal number based on a user-defined scale or calculated by comparing the number of pages or posts on the target site to a median figure for the sample population.

Background social relationships are characterized by the aggregate social weight of a domain, site, page or post without reference to the search term(s), which includes all link relationships.

A Meme correlation is a value between zero (0) and one (1) that describes the correlation of specified search terms on two or more sites over a user-specified time period.

The site reach may be defined by an integer value that describes the number of readers/viewers an agent addresses on a regular basis that can be ascertained by analyzing visitor logs or through a proxy measurement or third-party auditor.

IV. Hosted Service Embodiments

Embodiments of the present invention may be implemented in different ways, such as within an enterprise or as a computer readable medium. However, one implementation of the present invention is as a hosted service. Referring to FIGS. 7A, 7B, 7C, and 7D, one embodiment of the present invention is as a hosted service utilizing a server previously described in provisional application 60/777,975 as the "Persuadio server" 702. The arrows and lines in FIGS. 7A, 7B, 7C, and 7D are used to illustrate different modes of operation of the hosted service. In one embodiment the hosted service is used to monitor, map, measure, and engage conversations. Full-text linking of relationships of social media is preferably indexed to support generating a description and analysis of a networked conversations. As previously described, input criteria (e.g., keywords and URIs) may be input by a user to define a topic of conversation. The service then monitors the conversation using the social analysis tools. The evolution of the conversation can be mapped and measurements generated of various metrics, such as influence or a list of influencers. Engagement in a conversation is preferably supported, where an engagement is one or more posts and/or publishers where a user has entered the conversation. For example, engagement may occur via targeted advertisements or by identifying influential individual publishers for direct contact. The hosted service has applications such as managing crises, launching products, promoting brands, public relations, marketing, competitive intelligence, and monitoring problems associated with products. In one embodiment a Persuadio client application 704 includes a dashboard (described later in this application in more detail) to guide users around conversations, influencers and content. The client application 704 may, for example, support setting up alerts to notify users when the volume of conversation suddenly increases or other variances are exceeded or when a specific publisher (e.g., a specific blogger) joins a conversation. The dashboard may also generate a visual representation of a conversation network of social media, such as a social map of relationships between posts and other participants within a conversation.

In this example, the Persuadio server 702 implements the previously described conversation monitoring and social analysis. The Persuadio server 702 has several different applications. One application is to provide data to an ad server 706 for ad placement 707 to determine when and where to place ads in blogs, web sites, or other social media. Another application is to provide data that may be passed on to a Persuadio client application 704.

Figure 7A:
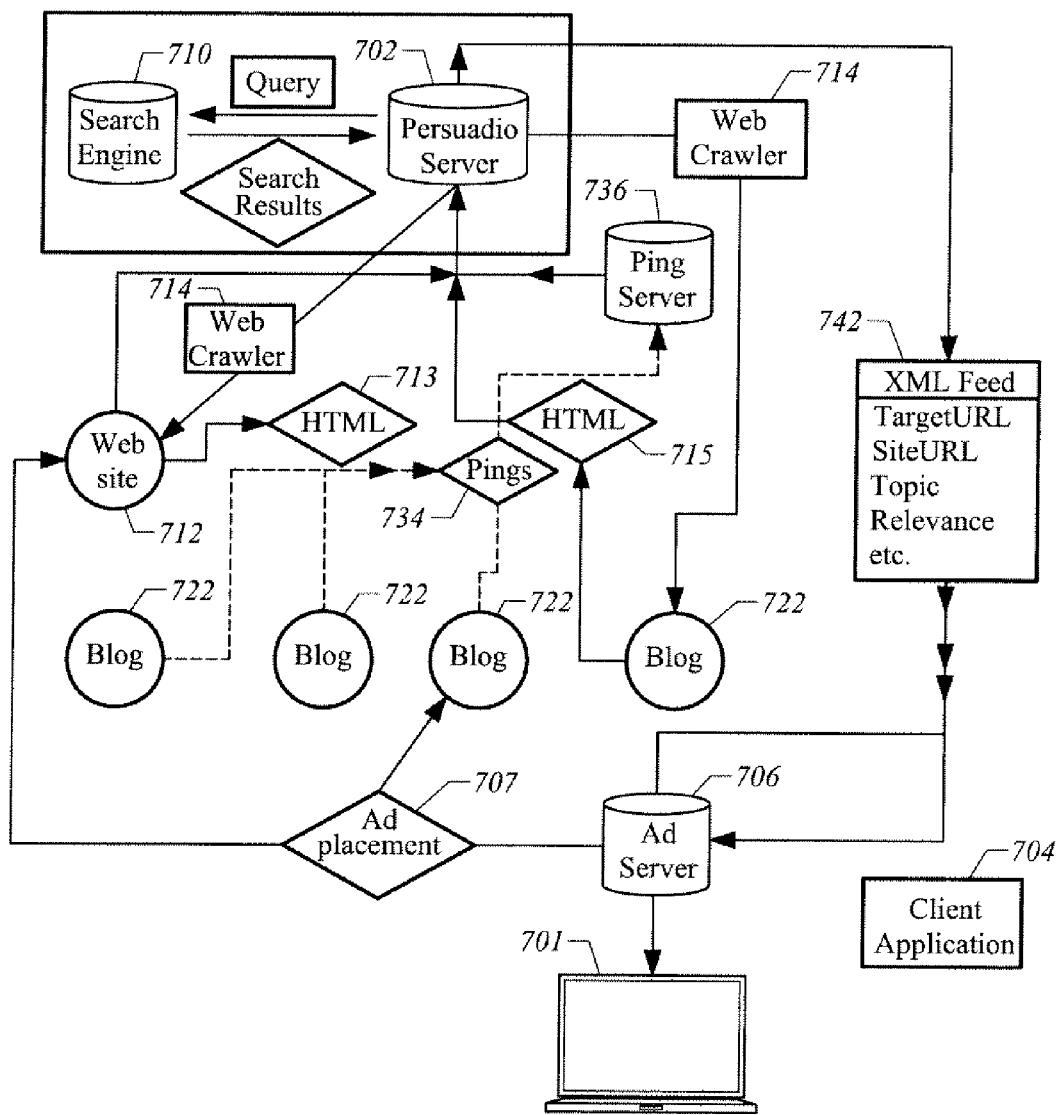
FIG. 7a illustrates interaction between a hosted service and conventional Search Engines in accordance with one embodiment of the present invention.

FIG. 7A illustrates the relationship between the Persuadio server and conventional search engines. As illustrated in FIG. 7A, in one embodiment, the Persuadio server can be implemented to query third-party search engines to assemble and analyze results for social relationships. The search results may be used to provide results annotated with social data to the Persuadio client application 704 or to configure additional web crawling and data gathering for social analysis.

Figure 7B:
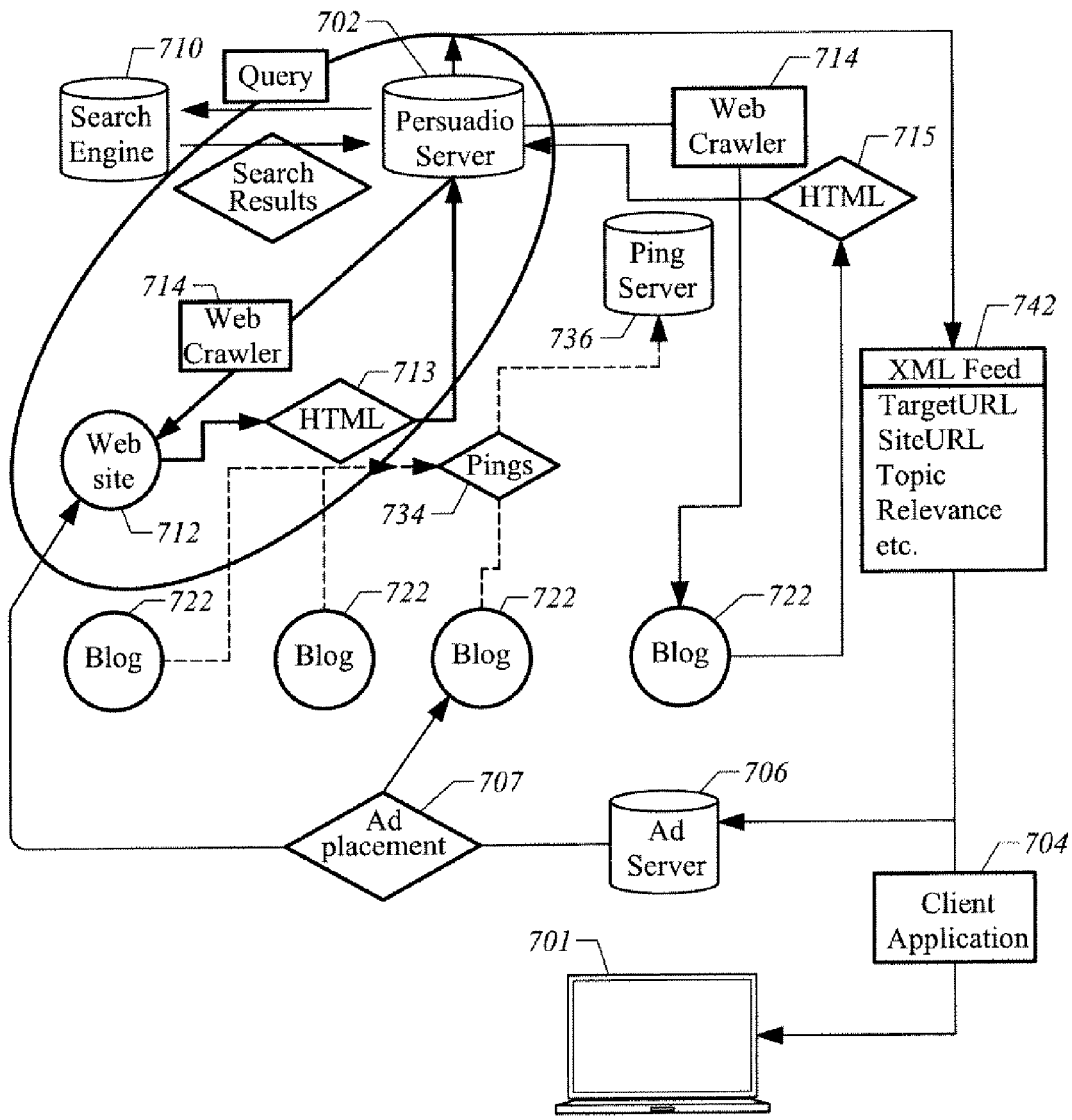
FIG. 7b illustrates interactions between a hosted service and Web Sites in accordance with one embodiment of the present invention.

FIG. 7B illustrates the relationship between the Persuadio server 702 and web sites 712. As illustrated in FIG. 7B, the Persuadio server 702 preferably uses web crawling tools 714 to collect the complete HTML 713 from each page of a web site. The HTML is analyzed to identify components of the Web page, collect and store relevant text and data, such as HTML tags that indicates the role of information in a discussion. Web site social influence data can be forwarded to ad placement servers, combined with blog and other data to create a view of the entire network of discussion, and delivered into the Persuadio client application 704.

Figure 7C:
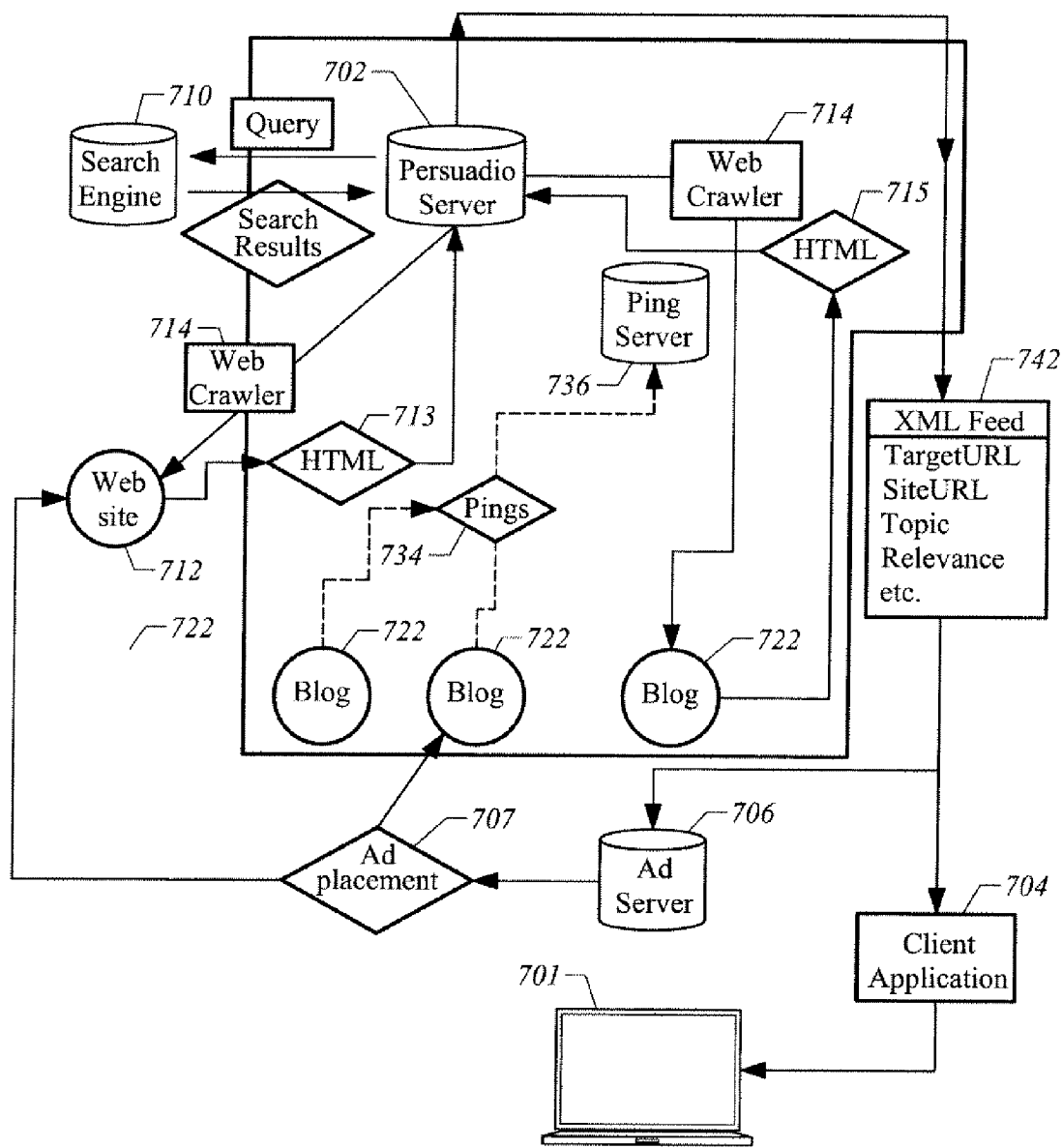
FIG. 7c illustrates interactions between a hosted service and Blog Server in accordance with one embodiment of the present invention.

FIG. 7C illustrates the relationship between the Persuadio server 702 and blog sites 722. As illustrated in FIG. 7C, the Persuadio server also preferably has a capability to capture data from social media, such as blogs. In one embodiment the Persuadio server 702 captures data from blogs using web crawling 714 and XML-RPC pings 734 generated by blogs or collected at a centralized pint server 736, such as pingomatic.com or Verisigns's Weblogs.com. When crawling a blog, the full HTML is preferably captured from the page, using tags to identify components of the page, differentiating between individual postings, comments and trackbacks displayed on the page. Each part of the page is important to understanding a specific part of a networked discussion. Pings may also be used to initiate a crawl of a page.

Figure 7D:
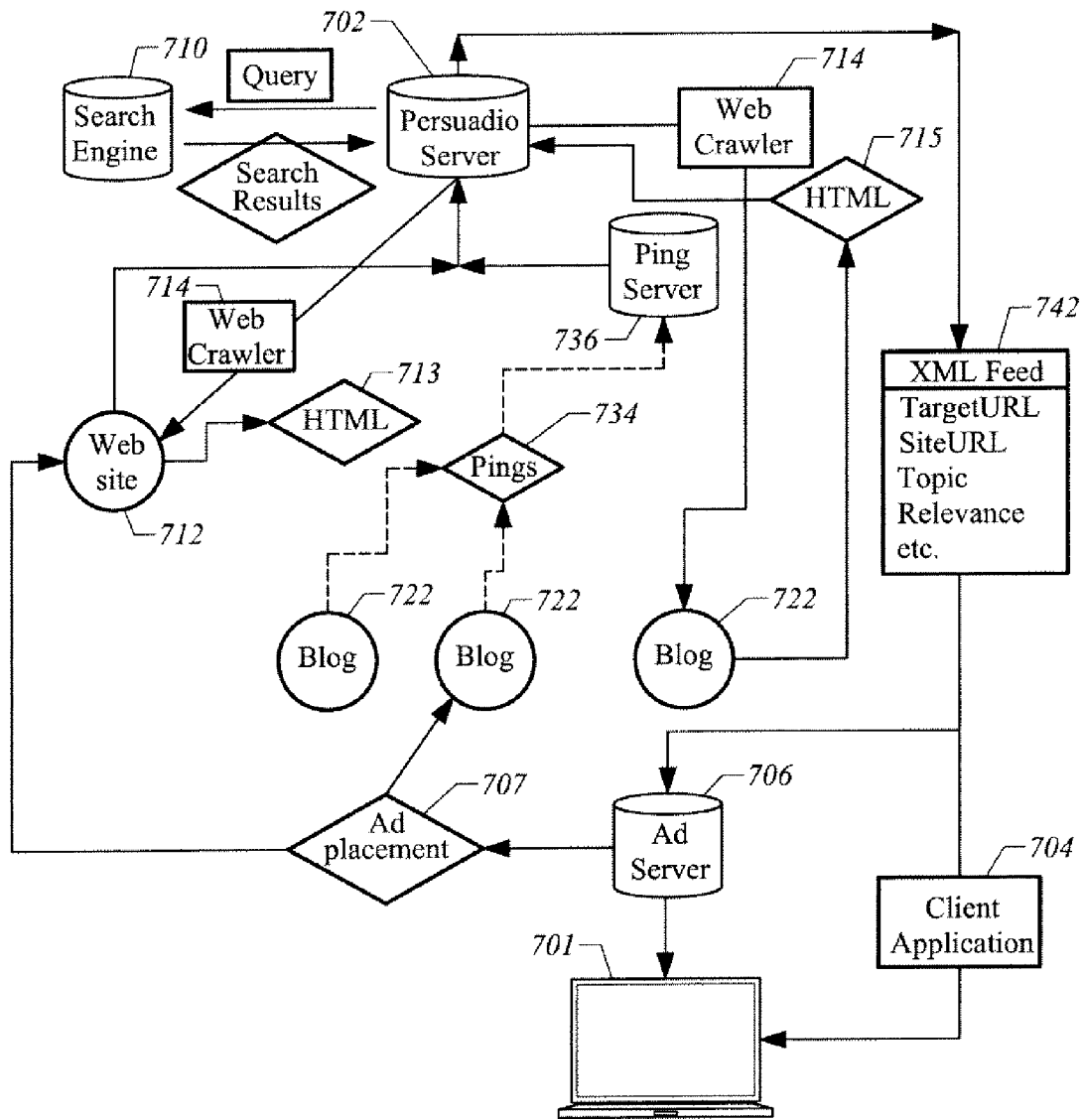
FIG. 7d illustrates interactions between a hosted service end-user and advertising server applications in accordance with one embodiment of the present invention.

FIG. 7D illustrates the relationship between the Persuadio server 702 and the generation of outputs. As illustrated in FIG. 7D, in one implementation, the Persuadio server 702 generates an XML feed 742 that may be used by other applications or servers. The XML feed 742, may for example, provide information to improve ad targeting, such as identifying key publishers and key times to insert an advertisement related to a particular topic. The XML feed 742 may also, for example, identify a list of key influencers of a conversation, provide visualization of networked discussions, or other outputs. Additionally, the XML feed 742 may be used to create visualization, spreadsheets, or other information for an end-user to understand a networked discussion. For example, an end-user may want a visualization or list identifying key influencers in a conversation, thresholds for the evolution of a conversation (i.e., key times in the development in a conversation), or a map illustrating the growth of a conversation.

The hosted service is preferably implemented as a scalable system and method for collecting data, calculating social metrics and expressing those metrics to describe conversational networks where individuals and entities exchange Web links, attention and other information about specific topics. The hosted system may be implemented as a collection of software functions and the configuration of those functions for optimal data gathering, analytics processing and publishing of resulting metrics as a stable standard protocol. The hosted service examines the source code of Web pages and documents stored on the Internet which may contain contributions by many people and links representing additional participants' ideas to identify individual components of social interaction, such as an article, Weblog posting, or reader comment each of these components has social characteristics, including influence within the conversation as a whole, influence on specific contributors, tone (positive or negative) and probabilities that it will continue to participate and the degree of that participation. Additionally, in the aforementioned embodiment, each agent or component of the conversation will have social characteristics that are dependent upon the specific topic under discussion, which can be correlated to its relationship to the participants' overall influence in a selected timeframe.

Figure 8:
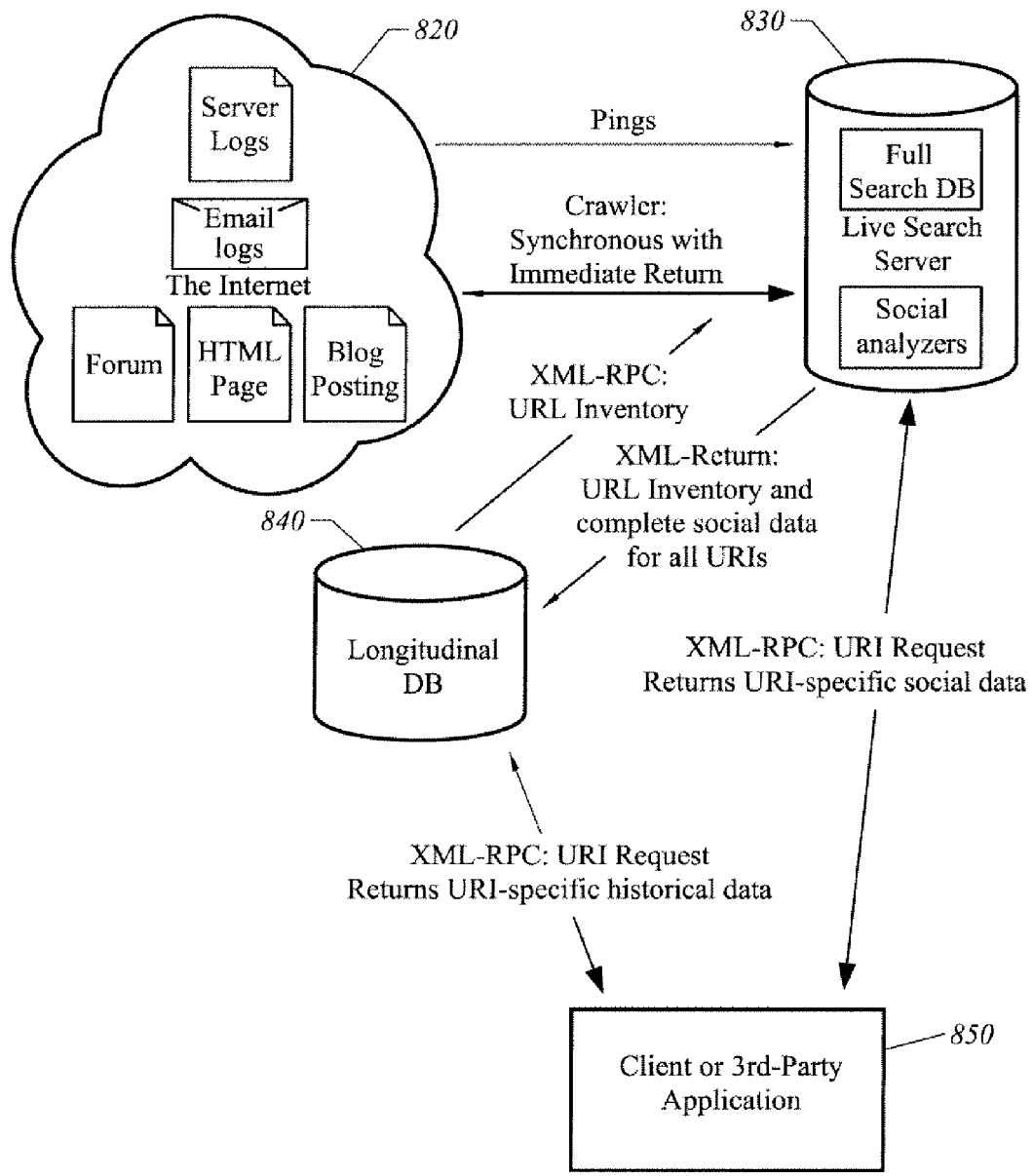
FIG. 8 is a network diagram illustrating XML protocols and their interaction with networked systems and services in accordance with one embodiment of the present invention.

FIG. 8 illustrate interactions in a networked environment accessing content on the Internet 820 using an embodiment having a search server 830, longitudinal database 840, client or third party application 850. The system preferably supports importing of data describing discussions between people conducted in person, through email, short messaging systems or in other recorded exchanges It includes a metadata format for expressing those statistical metrics for use in a variety of applications, including but not limited to media monitoring, advertising pricing and placement in a document, presenting search results, targeting marketing communications and network visualization as illustrated in FIG. 8. The metadata XML Protocol, which in one embodiment uses XML Namespaces, expresses multiple variables that can be used in calculations of influence value and/or positional coordinates describing a social relationship. XML Namespaces, provides an extensible foundation for communicating social metrics for use by a variety of end-user applications. The metadata protocol supports variable-sized textual and integer formats in all international character sets to provide many dimensions of social data.

The XML Protocol is a standardized format for storing social data generated by the system, which may be used for output to company-proprietary or third-party applications configured to interpret the data or for input of data from a company-proprietary or third-party data source. Specific fields may be used for attributes related to analyzing a conversation.

The table below illustrates some exemplary field definitions of the XML Protocol. Applications of the XML Protocol will be described later in more detail.

| Attributes | Meaning |
| --- | --- |
| TargetURI | The URI of the target posting or page described (multiple items may exist on the same page). |
| SiteURI | The top-level URI of the site where the target posting or URI is located. |
| Topic | Key search terms-Describes the topic of the discussion. |
| Relevance | Relevance of the target URI based on Topic [Ranked 0 to 1, on a scale] |
| Center | A mapping-specific field that defines the center of the network. If the search is a general query about sites around a specific site or URI, this URI defines the center of the network. This URI will not match the TargetURI unless it is the target URI. |
| TargetWeightURI | Social weight of the target URI within current network (the network is defined by the key search term). |
| TargetWeightSite | Social weight of the top-level URI where the target posting or URI is located within current network (the network is defined by the key search term). |
| InboundsURI | List of URIs pointing to the target URI, with time-created. |
| OutboundsURI | List of URIs pointed at by the target URI with time-created. |
| InboundsSite | List of URIs pointing to the site where the target URI is located. |
| OutboundsSite | List of URIs pointed at by the site where the target URI is located. |
| StrongLinksURI | List of sites strongly connected to the target URI as a [user configured] percentage of total connections. (One site may account for 10 percent, or 100 might) |
| StrongLinksSite | List of sites strongly connected to the top-level URI where the target URI is located as a [user configured] percentage of total connections. (One site may account for 10 percent, or 100 might) |
| FocalExURI | Focal exclusivity of target URI (percentage of the target posting or page discussing the search topic-based on generic and custom lexicons). |
| FocalExSite | Focal exclusivity of the top-level URI (percentage of the site where the target URI is located that is about the search topic-based on generic and custom lexicons). |
| Tone | Positive-Negative tonality based on generic or custom thesauri (Ranked +1 to −1) |

V. Illustrative Calibration, Crawl, and Social Analysis Methodology

As previously described, one aspect of the present invention is the conversation monitoring module may use a crawler to populate the conversation index. Additionally, as previously described the influence engine may use information on how document are linked to neighbors (directly or indirectly through intermediate links) to determine an influence score. It is therefore desirable to perform calibrations and optimizations of the crawling and social analysis.

Figure 9:
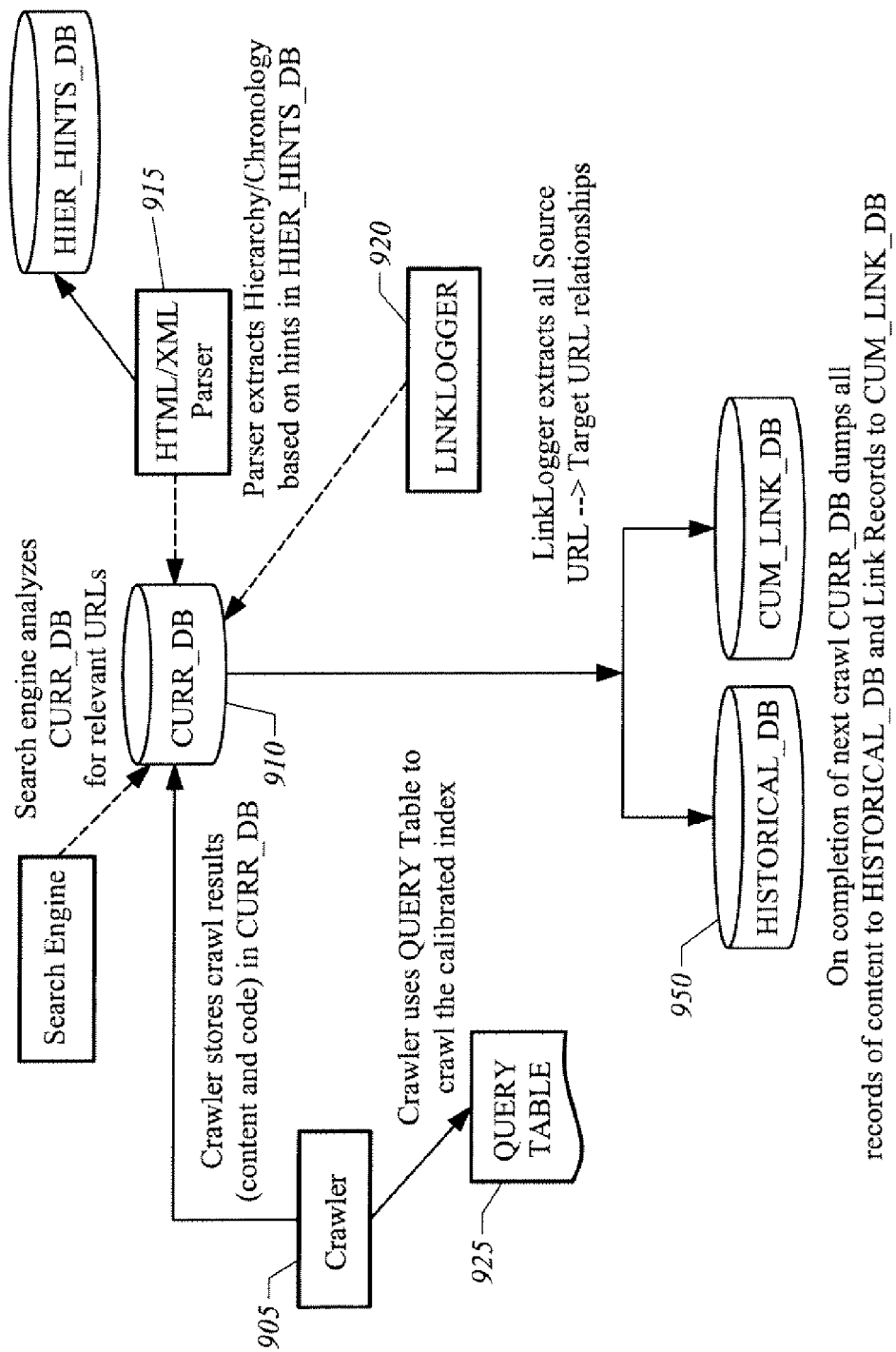
FIG. 9 is a flow chart of one embodiment of the data collection processes in accordance with one embodiment of the present invention.

An exemplary calibration methodology, crawl methodology, and social analysis methodology will now be described in more detail with reference to FIG. 9. Some of the aspects of a practical system include calibration, crawl methodology, and social analyzers.

A calibration process includes an initial series of crawls to develop a focused index of representative influential sites that define a conversational market. The calibration process utilizes a Web crawler, or "spider" application 905 and search engine-based analyzers working from a database-driven collection of query phrases. A database provides the storage volume for results of the current and historic crawls. An HTML/XML parser 915 implements a process that uses hints stored in a database to extract the hierarchy and chronology information from the raw data in the crawl database. A LIN-KLOGGER 920 implements a process that extracts and records all Source URI→Target URI relationships, recording them in crawl database.

The system can configure a research crawl based on a variety of user-selected inputs to define an initial target search. One example of a user-selected input is to define an initial target search based on single URI using the "link:" search command to capture all sites linking to the site-level URI of the target. Alternately, a user may provide a network of target URI's to define an initial target search. The initial target search is further limited by searching for target terms. As an illustrative example, a search for pages matching target terms may include 32 different search indices with public or private application programming interfaces. The system may be configured to begin its crawling based on a defined number of results after eliminating redundant URIs and normalizing the ranking scores used in different indices to a single scoring system. In the exemplar described herein, the system selects 1,000 results.

Exemplary Calibration Process

An exemplary calibration process includes five calibration steps.

In a first calibration step (Step 1), using the initial target data set, the system begins by placing a collection of seed Uniform Resource Locators (URLs) on a queue, prioritized by the relevance of the page. A separate process pulls the most relevant URL from the queue and crawls all of its outlinks, continuing to place URLs on the queue until it crawls two degrees away from relevant URLs. In addition, the system uses backward link references to discover all links pointing to a page on the queue and retrieves those URLs, adding them to the queue by priority of the child page.

In a second step of calibration (Step 2), the system analyzes the content and code of documents captured in the $1^{st}$ degree crawl [see above] using the HTML/XML Parser 915. It breaks down the content into component parts based on a hierarchy (domain, site, page, posting, comment) using code parsing hints stored in the database. Additionally, the system extracts time stamp information to establish the chronology of the information, tracking the date and time when components of the hierarchy were created (a page may have postings or comments created after the page creation date, for example). The components of the hierarchy with social characteristics to be tracked by the system are sites, pages, posting and comments.

The system also extracts all outbound links and creates an index of the creators (page creator, author, poster or commenter) identities, which are associated with source URIs (e.g., the URI of the commenter's blog), which can be crawled in the next step of the analysis.

Based on the user-specified timeframe of the calibration, the system may or may not collect content created and posted to the Internet on or before a user-defined date. If it does collect historical data, this is stored in the crawl database.

Data stored in fields based on THE XML PROTOCOL, all URI types may be listed in a single entry, the lowest in the hierarchy being the target URI described by other fields in the database for this entry/row. Each layer of the hierarchy inherits from the lower layers, e.g. DOMAIN inherits the SITE characteristics: DOMAIN_URI: The top-level domain name, e.g. buzzlogic.com; SITE_URI: The URI, including sub-domains or directories that indicate individual sections of a site controlled by a single author/editor or group of authors/editors, e.g. www.bloghost.com/Tomblog or "blogs.bloghost.com" or "money.cnn.com"; PAGE-POST_URI: The absolute URI of a single document stored on a site or server that includes a search term or other statement by an author that the user desires to monitor; COMMENT_URI: The absolute URI of a single comment, trackback or other reader-annotation to a page or post.

LINKLOGGER 920 examines each component of the hierarchy identified by HTML/XML Parser to find all outbound links, which are recorded in crawl database (e.g. "source URI"→"target URI" until all links are recorded). Data stored in fields based on THE XML PROTOCOL: *OutboundsURI: URI→URI:[time created]

Step 2 is repeated for the $2^{nd}$ degree and source URN of participants, collecting all data and code to extract all outbound links, chronology, participant identity source URIs. Step 2 may then be repeated for $3^{rd}$ and further degrees as specified by the user.

In a third step of calibration (Step 3) a check is performed on the data set of URIs/documents created in Step 2 for inbound, outbound and bi-directional link relationships within the network and, in the last degree, outbound links to non-network sites.

A calculation is performed of the social strength for each pair of sites based on the directionality of the links as indicated by the directional arrows below as follows:

---

1) Calculate site A –> B number of links;
2) Calculate site B –> A number of links;
3) Calculate site A <–> B links within individual articles, postings, comments * 1.5 (multiplier for bidirectional relationships);
4) Determine A –> B link relationship strength across whole network;
5) Determine median A –>B link relationship strength across whole network;
6) Score "1" for strong relationships (Top 30 percent);
7) Score "2" for normal relationships (Middle 30 percent); and
8) Score "3" for weak relationships (Bottom 40 percent)

---

Data is stored in fields based on following THE XML PROTOCOL:
1) StrongLinks[HIERARCHY Level]: List of sites with first-degree social weights, without Focal Exclusivity weights, in the top 30 percent; and
2) StrongLinksNoFoc[HIERARCHY Level]: List of sites with first-degree social weight with Focal Exclusivity weighted strongly in the top 30 percent.

In a fourth step of calibration, a calculation is performed to calculate social weight of each level of the hierarchy, excluding focal exclusivity, as we are concerned about link relationships at this point: (total # inbound links*weight [value 1→0])+(total # outbound links*weight [value+1→0])+(focal exclusivity 0) This calculation produces social weight for: Domains; Sites; Pages, Postings, and Comments.

Next, a calculation is performed of the social weight including focal exclusivity for each level of the hierarchy: (total # inbound links*weight [value 1→0])+(total # outbound links weight [value+1→0])+(focal exclusivity*weight [value 1]). This data indicative of strong links is stored in fields based on THE XML PROTOCOL:

StrongLinks[HIERARCHY Level]: List of sites with first-degree social weights, without Focal Exclusivity weights, in the top 30 percent StrongLinksNoFoc[HIERARCHY Level]: List of sites with first-degree social weight with Focal Exclusivity weighted strongly in the top 30 percent Focal exclusivity data is stored in fields based on THE XML PROTOCOL: *FocalEx[HIERARCHY Level]: Value.

Each level of hierarchy component above the identified components in the hierarchy is updated to reflect new focal exclusivity scores based on all lower hierarchy components. This data is stored in fields based on THE XML PROTOCOL: *FocalEx[HIERARCHY Level]: Value.

Each URI/hierarchy component is ranked for social weight w/o focal weight. This data is stored in fields based on THE XML PROTOCOL: *TargetWeightNoFoc[HIERARCHY Level]: Value.

Each URI/hierarchy component is ranked for social weight w/ focal weight. This data stored in fields based on THE XML PROTOCOL: *TargetWeight[HIERARCHY Level]: Value.

Each level of a hierarchy component above identified components in the hierarchy is updated to reflect new social weight w/o focal weight scores (background social connectedness without regard to topic). This data is stored in fields based on THE XML PROTOCOL: *TargetWeightNoFoc[HIERARCHY Level]: Value Each level of hierarchy component above identified components in the hierarchy is updated to reflect new social weight w/ scores (background social connectedness based on the search terms). This data stored in fields based on THE XML PROTOCOL: *TargetWeight[HIERARCHY Level]: Value.

The results of each day's calibration process are stored in the crawl database for use in the next day's crawl. If the system has been configured to capture historical data for use in analysis or benchmarking, that data is stored in crawl database, according to the parameters described in the crawl section below.

In a fifth step of calibration (step 5), after daily crawls, new domains/sites/postings/comments are added and all analysis in Steps 1 through 4 is conducted during the calibration period. Additional calculations are performed to aggregate median social weight of all sites that include the search terms. A selection is made of all OR 395 sites above the median social weight of the network, descending from the highest score. A selection is then made of all sites that include search terms with Strong pair-wise social strength relationships. A calculation is then made of the median social weight of the resulting index of sites. The result is the permanent index that will be crawled each day, adding new sites daily, conducting a "recalibration every day to add newly discovered Uniform Resource Locators (URLs) to the network, maintaining a complete record of all sites for periodic re-crawling. The results of the calibration process are stored in the crawl database for use by the crawler.

Exemplary Crawling Methodology

The crawling system implements steps the system takes on a user-defined schedule to extract current social metrics for a conversational environment. The crawling system includes a crawler and search engine-based analyzers working from a QUERIES table 925. The crawl database is the storage volume for results of the current crawl. A (HTML/XML) Parser 915 is a process that uses hints stored in the crawl database to extract the hierarchy and chronology information from the raw data in the crawl-database. A LINKLOGGER 920 is a process that extracts and records all Source URI→Target URI relationships, recording them in CURB DB 910.

In a first step of crawling, at crawl time, the crawler examines the database table of queries for search parameters. On the first day of the crawl, it uses the calibrated query table generated by the system during the calibration process. Each successive day, it uses the seed URIs contained in the calibrated query table PLUS all URIs identified as relevant by the system and stored in the StrongLinks and StrongLinksNoFoc fields of the crawl database.

The crawler captures page content and code for sites listed in the Permanent Index created during Calibration, plus first-, second- and n-degree links for all content added since the previous crawl, storing all content and code in crawl database.

In a second step of crawling, the search engine builds an index based on occurrence of the search terms according to user-specified parameters (e.g., proximity, tone, etc.)

The search engine records all new occurrences of search terms in the crawl database HTML/XML Parser 915 examines the content of the new data from crawled pages, using hints stored in the crawl database, to extract parts of pages that fall into different components of the Hierarchy.

Data stored in fields based on THE XML PROTOCOL, all URI types may be listed in a single entry, the lowest in the hierarchy being the target URI described by other fields in the database for this entry/row. Each layer of the hierarchy inherits from the lower layers, e.g. DOMAIN inherits SITE characteristics:

1) DOMAIN URI: The top-level domain name, e.g. buzzlogic.com;
2) SITE_URI: The URI, including sub-domains or directories that indicate individual sections of a site controlled by a single author/editor or group of authors/editors, e.g. www.bloghost.com/Tomblog or "blogs.bloghost.com" or "money.cnn.com";
3) PAGE-POST_URI: The absolute URI of a single document stored on a site or server that includes a search term or other statement by an author that the user desires to monitor; and
4) COMMENT_URI: The absolute URI of a single comment, trackback or other reader-annotation to a page or post.

The LINKLOGGER 920 examines each component of the Hierarchy identified by the HTML/XML Parser 915 to find all outbound links, which are recorded in the crawl database (e.g. "source URI"→"target URI" until all links are recorded). Data is stored in fields based on THE XML PROTOCOL: *OutboundsURI: URI→URI:[time created]

In a third step of crawling, each URI/hierarchy component ranked for focal exclusivity. Data is stored in fields based on THE XML PROTOCOL: *FocalEx[HIERARCHY Level]: Value.

Each level of hierarchy component above the identified components in the hierarchy is updated to reflect new focal exclusivity scores based on all lower hierarchy components.

The data is stored in fields based on THE XML PROTOCOL: *FocalEx[HIERARCHY Level]: Value.

Each URI/hierarchy component is ranked for social weight w/o focal weight. The data is stored in fields based on THE XML PROTOCOL: *TargetWeightNoFoc[HIERARCHY Level]: Value.

Each URI/hierarchy component ranked for social weight w/ focal weight. The data is stored in fields based on THE XML PROTOCOL: *TargetWeight[HIERARCHY Level]: Value.

Each level of hierarchy component above identified components in the hierarchy is updated to reflect new social weight w/o focal weight scores (background social connectedness without regard to topic). Data is stored in fields based on THE XML PROTOCOL: *TargetWeightNoFoc[HIERARCHY Level]: Value.

Each level of hierarchy component above identified components in the hierarchy is updated to reflect new social weight w/ scores (background social connectedness based on the search terms). Data is stored in fields based on THE XML PROTOCOL: *TargetWeight[HIERARCHY Level]: Value.

In a fourth step of crawling, each current URI/hierarchy component analyzed for pairwise linking to identify strong first-degree social relationships (background strong relationships).

Each current URI/hierarchy component analyzed for pairwise linking to targets with search term matches to identify first-degree topic-relevant strong relationships. Each current URI compared to the crawl database for previously known link relationships at each hierarchy level, and the results extracted and stored in the crawl database. Data ISstored in fields based on THE XML PROTOCOL:

StrongLinks[HIERARCHY Level]: List of sites with first-degree social weights, without Focal Exclusivity weights, in the top 30 percent;

StrongLinksNoFoc[HIERARCHY Level]: List of sites with first-degree social weight with Focal Exclusivity weighted strongly in the top 30 percent.

Exemplary Social Analysis Methodology

Step 1: Network Weaving

At the conclusion of the crawl sequence, the social analysis module performs a series of database searches on the crawl database to flesh out link relationships by topic/keyword and between all sites in the social network population. URIs stored in the database and are cross-referenced to their historical content (all pages with relevant content are stored in the database; the content of irrelevant pages are dumped but the URIs and times created are stored for potential future retrieval to do further analysis).

All inbound links to a given TARGET_URI are identified and stored in fields based on THE XML PROTOCOL: InboundsURI: List each URI and time created.

All outbound links from a given TARGET_URI are identified and stored in fields based on THE XML PROTOCOL: OutboundsURI: List each URI and time created.

Proceeding up the HIERARCHY, all inbound and outbound links for each identified HIERARCHY component are captured and stored in fields based on THE XML PROTOCOL:

InBounds[Hierarchy Level]: List each URI and time created

Outbounds[Hierarch Level]: List each URI and time created.

Step 2: Amplifier Mapping

The content of CURR_DB 910 and HISTORICAL_DB 950 are queried for HIERARCHY components matching the search terms and the times those URIs were created. The results are parsed to produce a chronology of the appearance of related content on the network and the flow of background relationships. The chronology is examined for pages that are inbound-linked to by more than the median number of pages linked to in the sample population.

All Amplifiers for a given TARGET_URI are identified and stored in fields based on THE XML PROTOCOL: Amplifiers: List each URI and time created. URIs ranked by highest number of links to the target URI descending.

Proceeding up the HIERARCHY, all Amplifiers for each identified HIERARCHY component are captured and stored in fields based on THE XML PROTOCOL: Amplifiers[Hierarch Level]: List each URI and time created. Ranked by highest number of links to the target URI descending.

At the Site level (that is, the blog or site controlled by a single author/editor or group of authors/editors), Amplifiers are analyzed for all site relationships and the topic-based relationships the site has over time and stored in fields based on THE XML PROTOCOL:

SiteAmplifier: List each site, the number of inbound connections from the site to the target site, and the times links created. Ranked by highest number of links to the target URI descending;

TopicAmplifier: For each search term the site contains, list the sites that have linked to pages containing those terms and the times links were created. Ranked by highest number of links to the target URI descending.

Finally, the individual Amplifier chronologies are examined to identify sites that have linked to the target site—both generally and to pages containing search terms within a user-defined timeframe and stored in fields based on THE XML PROTOCOL:

RecentAmplifiers: List each site, the number of inbound connections from the site to the target site, and the times links created. Ranked by highest number of links to the target URI descending during the specified timeframe.

RecentTopicAmplifiers: List each site, the number of inbound connections from the site to the target site, and the times links created. Ranked by highest number of links to the target URI descending during the specified timeframe.

Step 3: Leader/Follower Analysis

Step A

In this step, we are looking for the strong relationships within small portions of the social network and calculating the likelihood that those relationships will produce reliable leader-follower behavior. A site may be both a leader and a follower.

Using the Amplifier chronologies created in Step 2, calculate the normal distribution of inbound link relationships between all source and target URI for the sample population over the user-defined timeframe. We're looking for the distribution of URIs created:URIs point to each URI created.

Find the median and variance within the distribution of link relationships. Then calculate the probability that any URI created will receive an inbound link. Store the probability for the entire sample for use in other calculations.

Next, break down the normal distribution by percentage, taking each 10-percent bracket and calculating the probability a URI created in that tenth of the distribution will receive an inbound link. Store the probability for each bracket for use in other calculations.

To find site-level leader relationships, eliminate all non-repeating Site relationships from the URI list, so that the sample contains only URIs in sites that garner repeat inbound links from other sites.

Calculate the normal distribution of inbound link relationships between all source and target URI for the Site relationships sample population over the user-defined timeframe.

Find the median and variance within the distribution of Site link relationships. Then calculate the probability that any URI created within one of these sites will receive an inbound link. Store the probability for the entire sample of Site relationships for use in other calculations.

Next, break down the normal distribution by percentage, taking each 10-percent bracket and calculating the probability a URI created in that tenth of the distribution will receive an inbound link. Store the probability for each bracket for use in other calculations.

Step B

In this step, we are looking for the strong link relationships based on the keyword focal exclusivity.

Using the TopicAmplifier chronologies created in Step 2, calculate the normal distribution of inbound link relationships between all source and target URI for the sample population over the user-defined timeframe. We're looking for the distribution of URN created:URIs point to each URI created.

Find the median and variance within the distribution of link relationships. Then calculate the probability that any topic-specific URI created will receive an inbound link. Store the probability for the entire sample for use in other calculations.

Next, break down the normal distribution by percentage, taking each 10-percent bracket and calculating the probability a URI created in that tenth of the distribution will receive an inbound link. Store the probability for each bracket for use in other calculations.

To find site-level topic-specific leader relationships, eliminate all non-repeating Site relationships from the URI list, so that the sample contains only URIs in sites that garner repeat inbound links from other sites.

Calculate the normal distribution of inbound link relationships between all source and target URI for the Site relationships sample population over the user-defined timeframe.

Find the median and variance within the distribution of Site link relationships. Then calculate the probability that any URI created within one of these sites will receive an inbound link. Store the probability for the entire sample of Site relationships for use in other calculations.

Next, break down the normal distribution by percentage, taking each 10-percent bracket and calculating the probability a URI created in that tenth of the distribution will receive an inbound link. Store the probability for each bracket for use in other calculations.

Step C

Assign URI- and Site-level probabilities to each URI in the database. These probabilities are a range that can be applied to estimating the likelihood any site, blog, posting or comment will instigate more discussion.

Assign topic-specific URI- and Site-level probabilities to each topic-specific URI in the database. These probabilities are a range that can be applied to estimating the likelihood any topic-specific site, blog, posting or comment will instigate more discussion.

Step D

"Leaders" are identified from the sample population. They are sites with the highest average URI-level probability to attract multiple links.

"Topic Leaders" are identified in the sample population. They are sites with the highest average topic-specific URI probability to attract multiple links.

Step E

Follower analysis identifies sites most likely to be drawn into a conversation, described as "Susceptibility."

Using the Amplifier chronologies created in Step 2, calculate the normal distribution of outbound link relationships of all URIs in the sample population over the user-defined timeframe.

Find the median and variance within the distribution of link relationships. Then calculate the probability that any URI created will include an outbound link. Store the probability for the entire sample for use in other calculations.

Next, break down the normal distribution by percentage, taking each 10-percent bracket and calculating the probability a URI created in that tenth of the distribution will include an outbound link. Store the probability for each bracket for use in other calculations.

To find site-level follower relationships, eliminate all non-repeating Site relationships from the URI list, so that the sample contains only URIs in sites that include repeat outbound links to other sites.

Calculate the normal distribution of outbound link relationships between all source and target URI for the Site relationships sample population over the user-defined timeframe.

Find the median and variance within the distribution of Site link relationships. Then calculate the probability that any URI created within one of these sites will include an outbound link. Store the probability for the entire sample of Site relationships for use in other calculations.

Next, break down the normal distribution by percentage, taking each 10-percent bracket and calculating the probability a URI created in that tenth of the distribution will include an outbound link. Store the probability for each bracket for use in other calculations.

Step F

In this step, we are looking for the susceptibility based on the keyword focal exclusivity.

Using the TopicAmplifier chronologies created in Step 2, calculate the normal distribution of outbound link relationships between all source and target URI for the sample population over the user-defined timeframe.

Find the median and variance within the distribution of link relationships. Then calculate the probability that any topic-specific URI created will include an outbound link. Store the probability for the entire sample for use in other calculations.

Next, break down the normal distribution by percentage, taking each 10-percent bracket and calculating the probability a URI created in that tenth of the distribution will include an outbound link. Store the probability for each bracket for use in other calculations.

To find site-level topic-specific follower relationships, eliminate all non-repeating Site relationships from the URI list, so that the sample contains only URIs in sites that create repeat outbound links to other sites.

Calculate the normal distribution of outbound link relationships between all source and target URI for the Site relationships sample population over the user-defined timeframe.

Find the median and variance within the distribution of Site link relationships. Then calculate the probability that any URI created within one of these sites will include an outbound link. Store the probability for the entire sample of Site relationships for use in other calculations.

Next, break down the normal distribution by percentage, taking each 10-percent bracket and calculating the probability a URI created in that tenth of the distribution will include an outbound link. Store the probability for each bracket for use in other calculations.

Step G

Assign URI- and Site-level outbound linking probabilities to each URI in the database. These probabilities are a range that can be applied to estimating the likelihood any site, blog, posting or comment will join an existing conversation.

Assign topic-specific URI- and Site-level outbound linking probabilities to each topic-specific URI in the database. These probabilities are a range that can be applied to estimating the likelihood any topic-specific site, blog, posting or comment will join an existing topic-specific conversation.

Step H

"Followers" are identified from the sample population. They are sites with the highest average URI-level probability to create multiple outbound links.

"Topic Followers" are identified in the sample population. They are sites with the highest average topic-specific URI probability to create multiple outbound links.

Step 4: Velocity

The Inbounds and Outbounds links data store is examined for links created by new participants during a user-defined timeframe (day/week/two weeks/month). The total number of new participants at all levels of the hierarchy during the timeframe is subtracted from the total new participants in the previous period equal to the user-defined timeframe. If there are more new participants in the most recent timeframe, the product will be a negative number, which must be converted into a positive number in order to divide it by the total of the previous timeframe to produce a percentage value between zero [0] and one [1]. If there are fewer participants in the most recent timeframe, the product will be a positive number, which must be converted into a negative number in order to divide it by the total of the previous timeframe to produce a negative percentage value between zero [0] and negative-one [−1].

VI Run Time Analysis to Support Dynamic Analysis of Conversations

One aspect of conversations in social media is that conversations can rapidly propagate and be amplified. In many applications it is desirable to support the capability of an end-user to monitor and engage highly dynamic conversations. As an illustrative example, a marketing person may want to know what is happening every day to influence a conversation about a particular product. As another example, in the case of a product defect, a company executive may want to understand how influence is dynamically changing. It is therefore useful to support a capability to provide a run time view of influencers for a specific conversation being queried. Additionally, in some applications it is desirable to automatically generate a view of influencers for an end-user on a scheduled basis, such as generating a daily view of influencers for a conversation.

As people publish new social media and trackback, tag, or vote on social media, the network of content grows. In one implementation, the conversation index is updated in a fashion that reflects those changes at query time. That is, the conversation index is updated as social media is published within the conversation index. As previously described, in one embodiment the calibration process performs research crawls for a conversation network. Scheduled crawls (e.g., daily crawls) may be performed to update the conversation index and recalibrations may be performed to update the content and links in the conversation index. Business rules may be employed to direct spiders to examine both new and existing social media content which are part of the conversation network. In any case, by updating the content and links in the conversation index for a particular conversation network, a list of influencers can be generated at query time. As will be described below in more detail, user interfaces may be provide to display a list of influencers at query time and/or according to a schedule.

Note that a conventional search engine cannot be used to generate a list of influencers at query time. As previously described, a conventional search engine does not generate a conversation index from which influencers can be determined Additionally, a conventional search engine essentially rely on static snapshots of content that freezes metadata around each document.

VII Illustrative User Interface and Dashboard Tools

Figure 10:
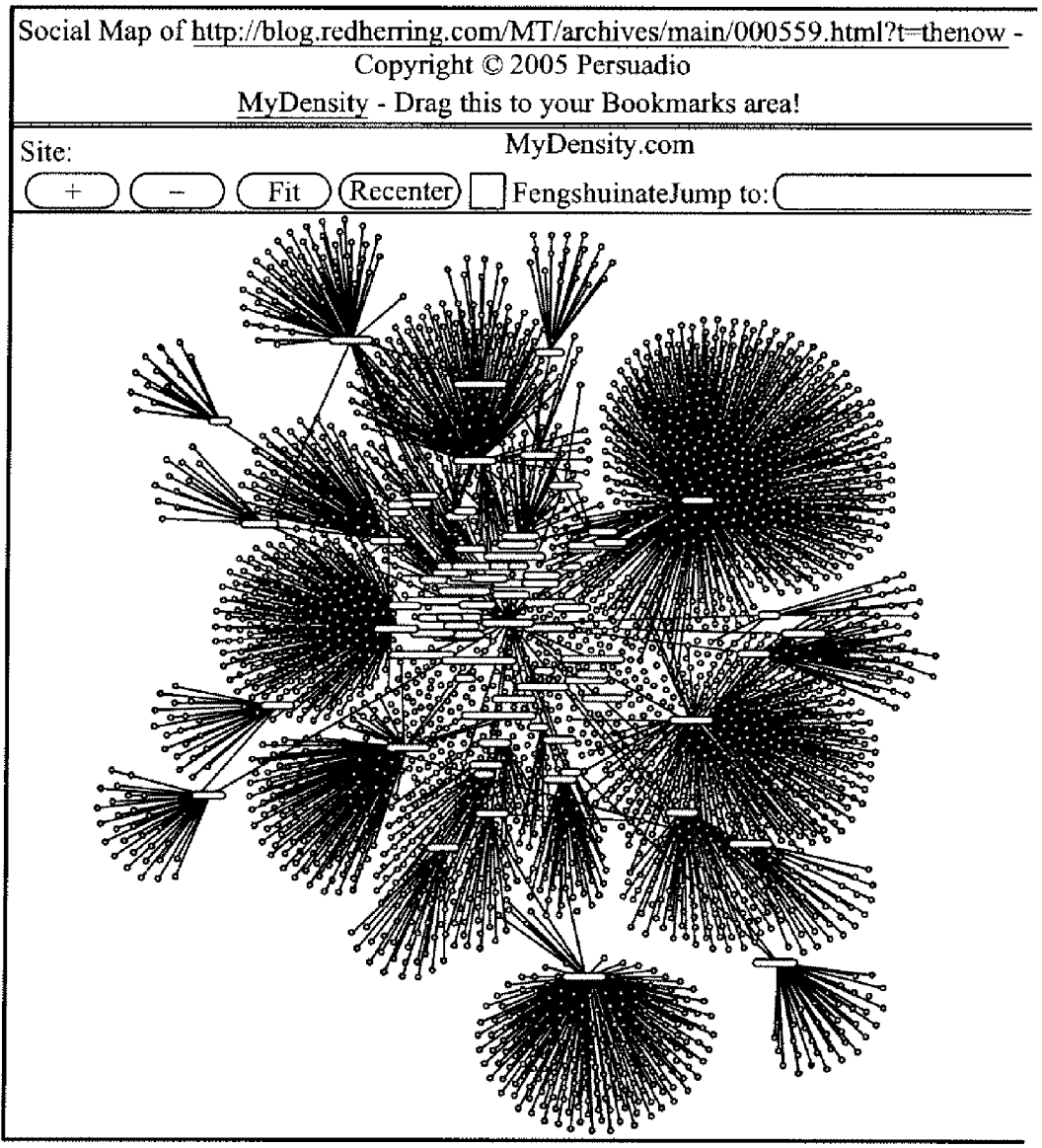
FIG. 10 illustrates a visualization of a networked conversation in one embodiment of the system.

As previously described, one application of the present invention is to generate a map which is a visual representation of a networked conversation. In one embodiment of the system, relationship coordinates and social weight are used to display a map of two degrees of the social network surrounding a single URI. The map shows only links, not the strength of relationships, traffic flow and or other characteristics of the social relationships between sites as illustrated in FIG. 10. Users can generate a map by typing a URL in an address bar of a compatible Web browser or via a user bookmark to generate a map for a site open in the browser. The map's Java-based interface allowed users to mouse over any node in the map to see its name of the site displayed in the "Site:" field just above the zoom in ("+") and zoom out ("−") buttons in the upper left corner of the map. As the user mouses over the nodes in the map, they can active links between sites. Double-clicking any node in the map opens a new browser window and displays the Web site. This provides a simple way to browse the neighborhood around any site. The maps open with the site chosen in the center, with the sites it was directly connected to arrayed around that site in a circle. Second-degree connections—the sites connected to the first-degree sites but not to the URI mapped—are around the first-degree sites to which they are linked. Maps of popular sites could be quite dense and the Fengshuinate box can be checked to see the map of how all the sites are interconnected by rearranging the map to show the most central sites in the network. Unchecking Fengshuinate froze the map in its new arrangement. Clicking once on any node in the map would reorient the map around that node. The user could also browse all the sites in the map by clicking the "Jump to:" menu, which displayed a list of all the sites in the map—selecting a site in the Jump to: menu oriented the map around that site. Changing the map would may make it expand outside the available window. Clicking the "Fit" button to resize the map automatically. The "Recenter" button place the map back in the middle of the window, with the current target URI.

Figure 11:
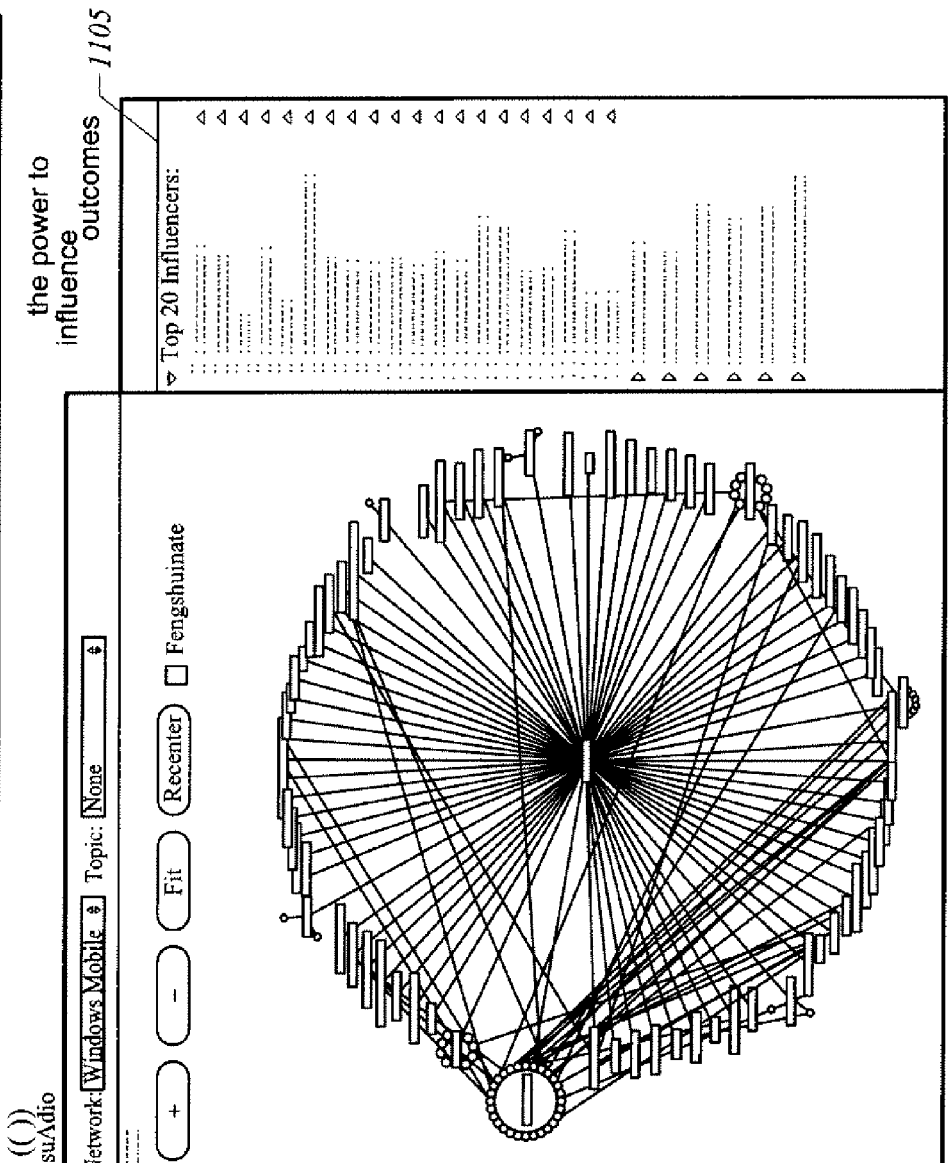
FIG. 11 illustrates an implementation of a public relations monitoring dashboard in one embodiment of the system.

As previously described, one application of the present invention includes generating a dashboard user interface. In one implementation, strong ties in the map are highlighted, as illustrated in FIG. 11. In this exemplar the map displays the strongest pairwise connections in the social network as heavier lines than others displaying connections between sites. This allows users to see at a glance where the strongest person-to-person connections within a social network are located. The dashboard also illustrates how additional analytical results may be layered into the display. In this case the top influencers 1105, top media sites, top blog sites, top amplifiers, top new participants (described as "new hits"), top sites where conversations are crossing over with other topics, and top sites where there is no crossover with other topics, to allow the user to browse quickly to find individual sites of interest. This map is also navigable, allowing users to click on a node to reorient the map around so that they can explore how the node relates to other traffic, particularly with strong connections. The drop-down menus listing top influencers, amplifiers, etc., allow the user to open a new map oriented on the site they select. Additionally, the lists provide graphical arrows to indicate whether the site listed in rising or falling in the category.

Figure 12:
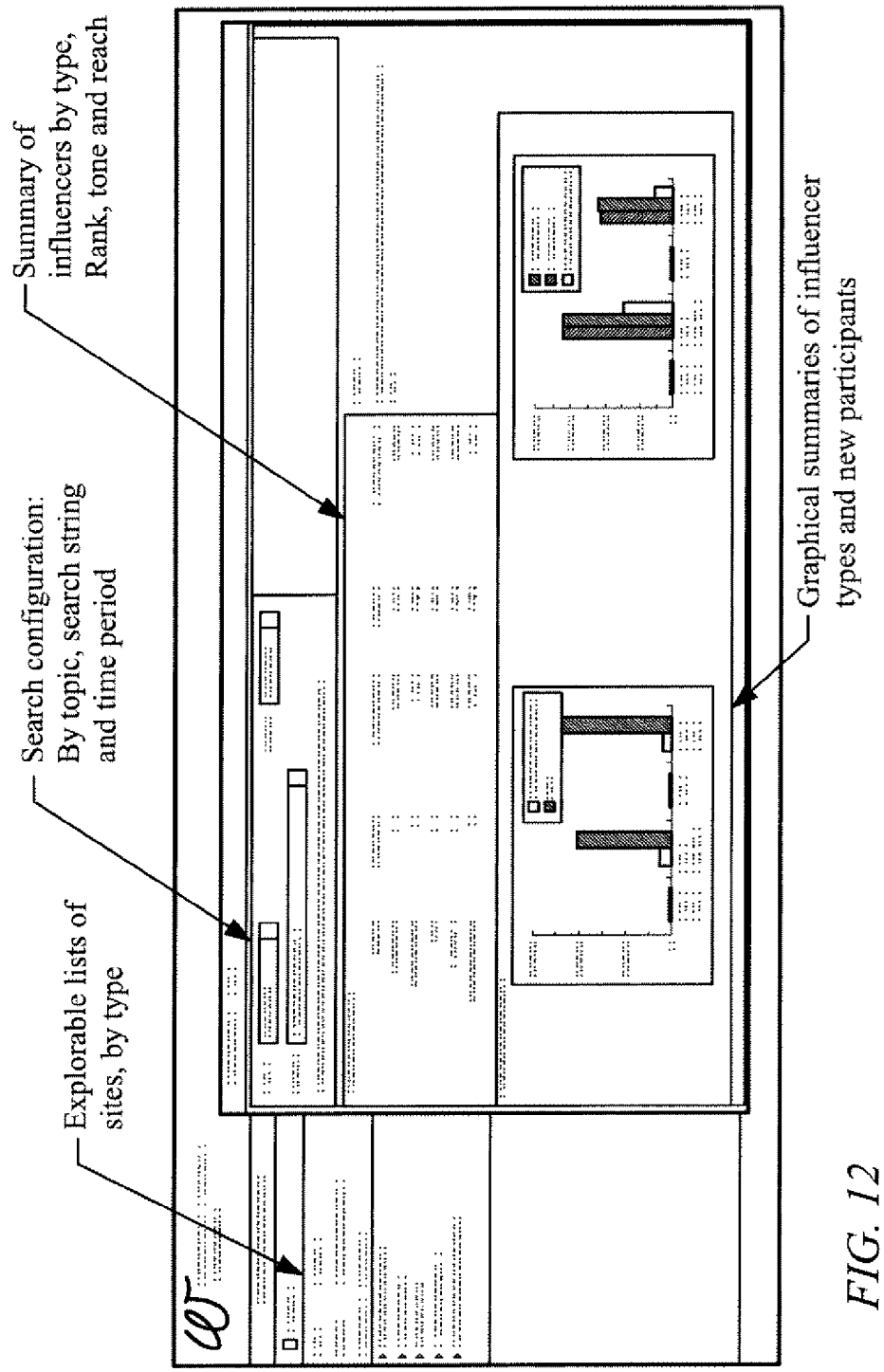
FIG. 12 illustrates top-level of a dashboard and FIG. 13 illustrates an associated detailed navigation guide of data social metrics in one embodiment of the system.

FIG. 12 illustrates a Marketing Dashboard. In this exemplar, the user has a configurable interface for reviewing a large library of searches, which can be browsed by topic, search string and time period. Additionally, the top sites in various categories (e.g. "Top Influencers") are available through a drop-down menu and summary data for each search is displayed, including the number of sites overall with matches to the search terms, the number of occurrences of those search terms, the aggregate tone of the conversation and other data. Other features include a summary of influencers by type, rank, tone, and reach. Graphical summaries of influencer types and new participants may be provided. The marketing dashboard has many potential uses, such as in public relations.

The design of this dashboard is intended to help marketers reduce the complexity of conversational information. Unlike other systems that track the appearance of search terms on sites and in blogs, the dashboard provides filters that allow users reduce the population of participants to those with the greatest influence, ability to increase the velocity of information and other factors. Additionally, the tone of articles can be displayed, which permits positive and negative documents to be identified.

Figure 13:
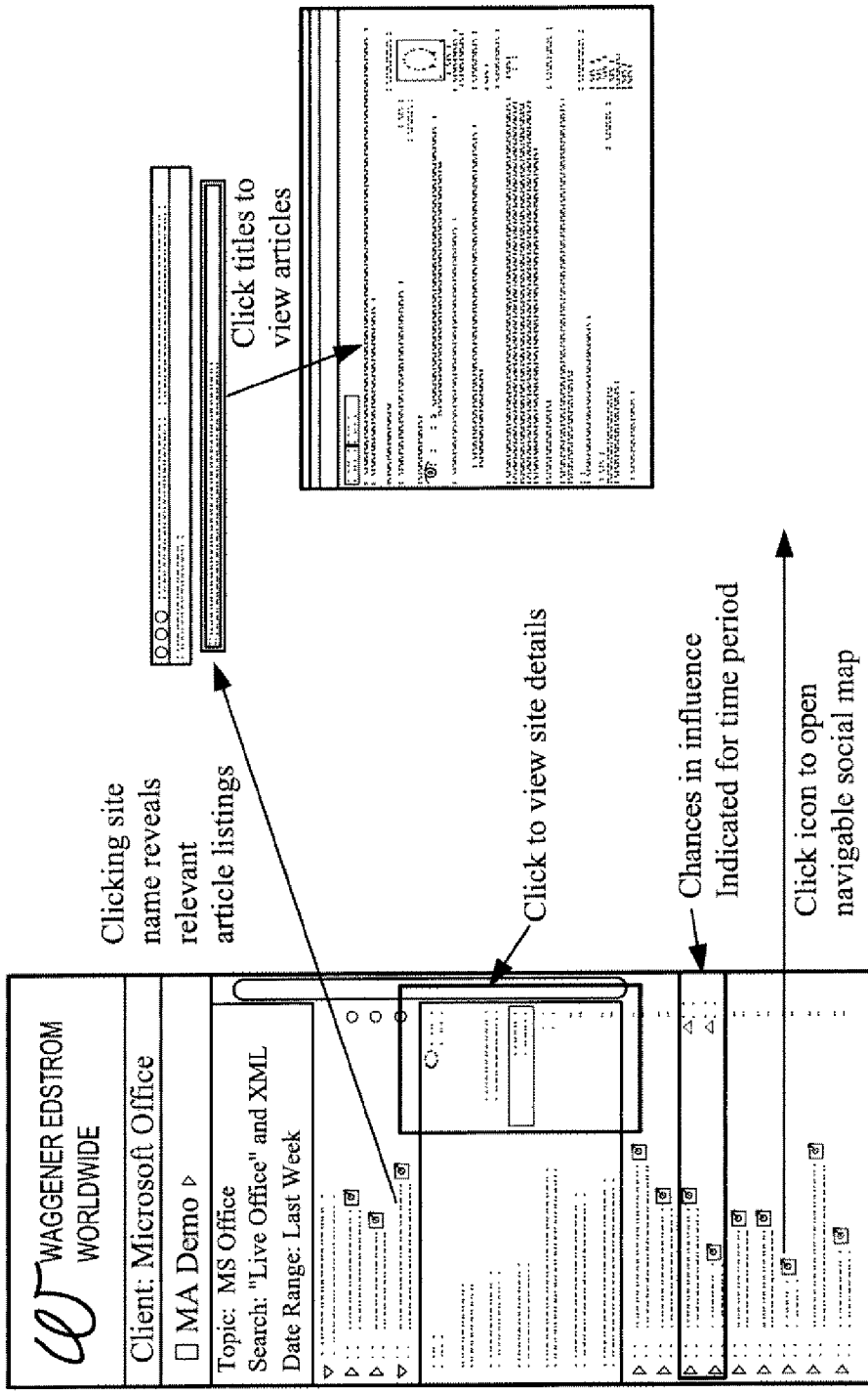

FIG. 13 illustrates a detail navigation. This dashboard includes graphical information about the sites increasing or decreasing influence in each drop-down list-indicated by a numerical change in ranking- and additional data about each site in the list, in this case culled from the Alexa database that describes network traffic rankings and BuzzLogic-generated data about conversational tone and number of inbound and outbound links. Lists of articles with search term matches are displayed on clicking of the site name in each list; these article listings, when clicked, opens a browser and displays the content of the article. A map similar to those explained above are available through a clickable icon in the drop-down list. As can be seen in FIG. 13, in one implementation a list of influencers, such as the 20 top influencers, is provided. For each influencer the interface permits recent article listings to be displayed. Other aspects of influence are displayed. As can be understood from FIGS. 12 and 13, the dashboard provides a powerful new tool. Once a conversation topic is defined by a user, the user can receive a visual display of influencers, summaries of important aspects of the conversation (such as tone), and quickly access articles posted by the influencers.

Figure 14:
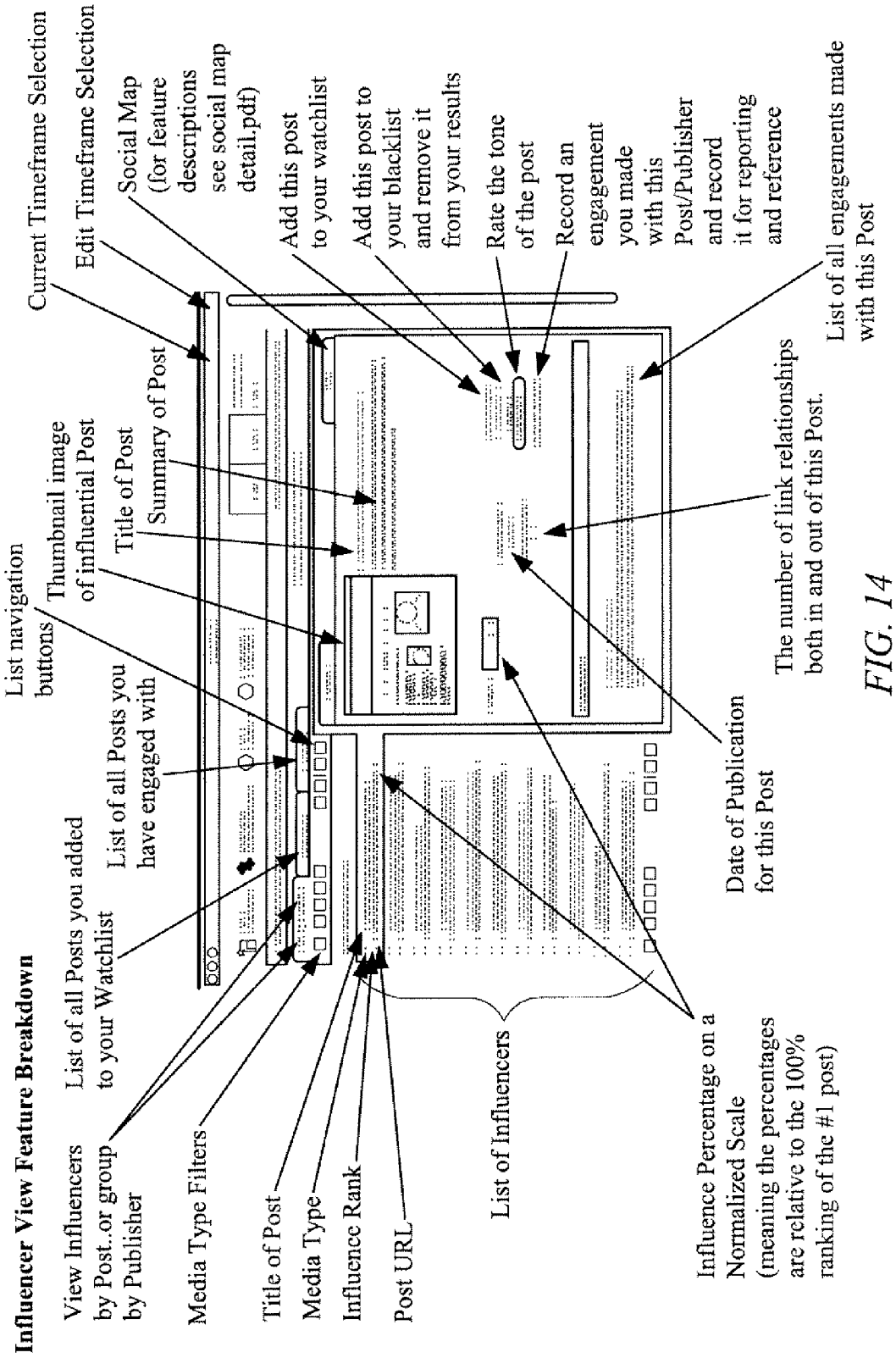
FIGS. 14-16 illustrate additional dashboard embodiments in accordance with embodiments of the present invention.
Figure 15:
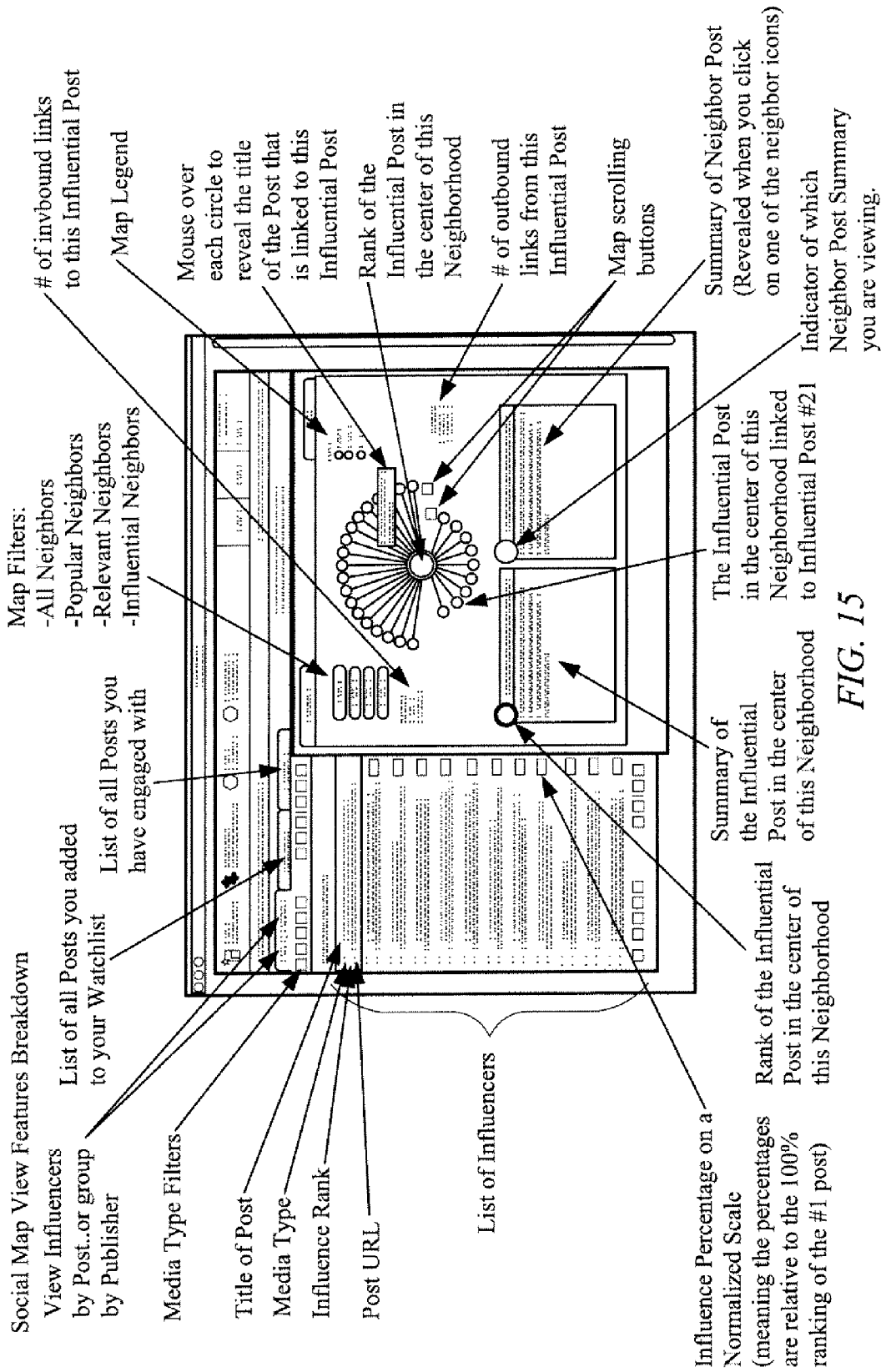
Figure 16:
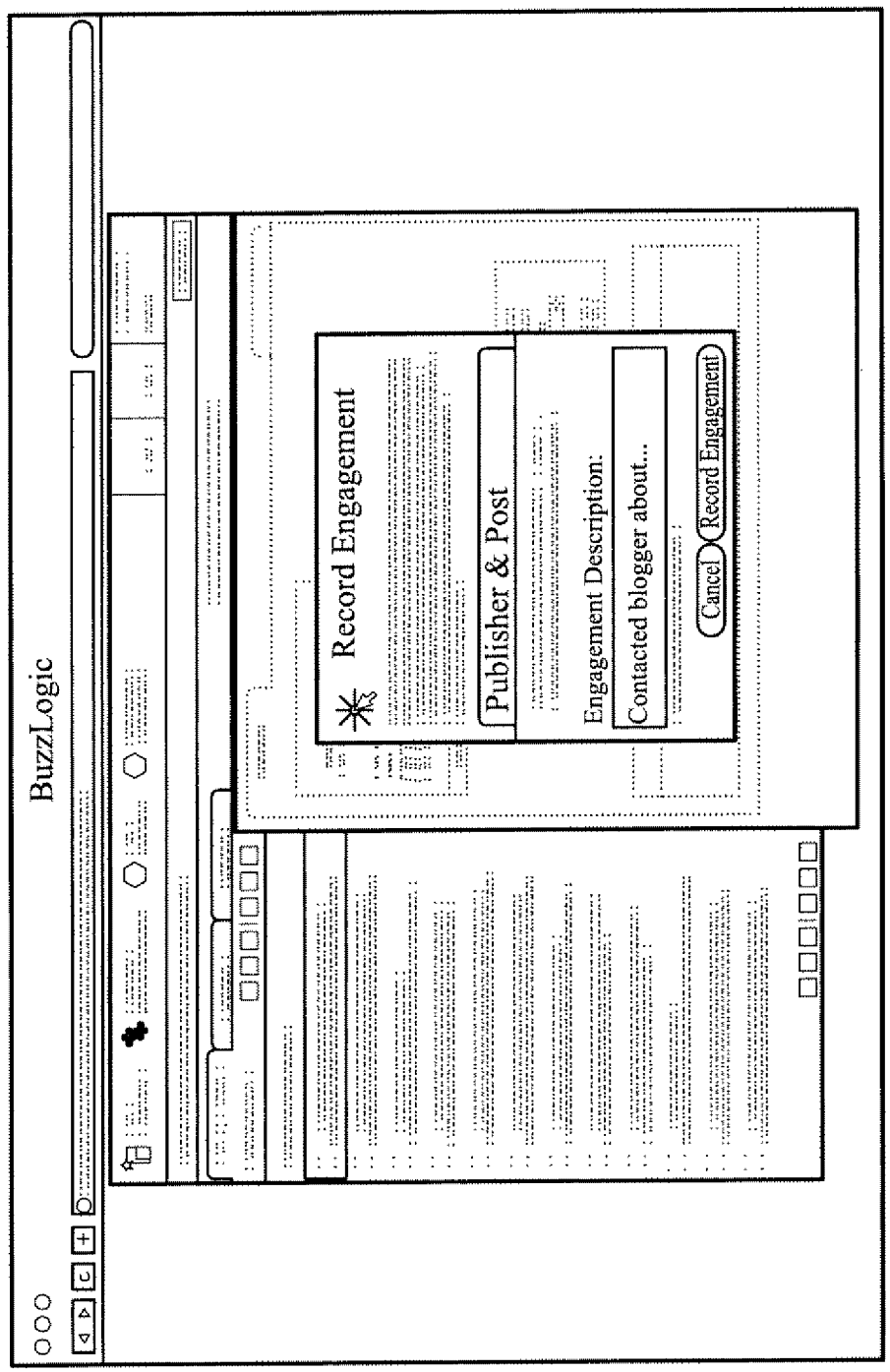

FIG. 14 illustrate a screenshot showing an "influencer view feature." A list of influencers is displayed, which is ranked and assigned a percentage score. Filters are provided to filter by media type. A list of all engagements made the post is provided. In this example, the list of influencers corresponds to a list of posts. The list of influencers permits access to summaries of the corresponding posts, thumbnail images, date of publication, and number of link relationships both in and out of the post. FIG. 15 illustrates how in one embodiment a social map is generated displaying neighbors about a center post. FIG. 16 illustrates a screenshot displaying how an engagement with a publisher of an influential post may be recorded.

It will be understood an embodiments of the present invention may include implementing the conversation identification module and social analysis modules in a computer readable medium. An embodiment of the present invention therefore relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of targeting online advertising, comprising:
repeatedly crawling the web to maintain a database of historical online content in a computer system;
applying search engine queries via the computer system to the database to produce search results, wherein said queries include keywords, Boolean operators and universal resource indicators (URIs) defining a topic of conversation to be explored;
optimizing said search result sets for relevance to said topic by applying multiple queries to produce a search result set over time including multiple instances of online content related to said topic of conversation and publishers of said multiple instance of topic related online content;
determining influence of said publishers on said online content on the topic of conversation by scoring, in said search result sets,
  a) attributes of both a particular instance of said topic related online contents, as well as
  b) attributes of online content that link to that particular instance, and
  c) a conversational correlation between two or more of said publishers related to said topic of conversation; and thereafter
targeting online advertising to one or more of said publishers determined to then have the highest level, or rate of change, of influence.

2. The method of claim 1, wherein said topic is a conversation between said online content publishers.

3. The method of claims 1 or 2, wherein said attributes of said topic related online content include one or more of page popularity, site popularity, relevance, recency, inlink recency, inlink page popularity and inlink popularity.

4. The method of claims 1 or 2, wherein targeting online advertising further comprises:
predictively analyzing changes of influence of some of said topic related online content and/or said publishers over time.

5. The method of claim 4, further comprising:
extrapolating future roles of said influential publishers in commercial brand perception.

6. The method of claims 1 or 2, wherein targeting online advertising further comprises:
retrospectively analyzing changes of influence on said topic by extracting date and time information in said database of historical online content related to selected said publishers.

7. The method of claims 1 or 2, wherein targeting online advertising further comprises:
providing data identifying selected said publishers to an ad server for online ad placement.

8. The method of claims 1 or 2, wherein targeting online advertising further comprises:
identifying a selected publisher and a key time to insert an advertisement related to the topic.

9. The method of 1 or 2, wherein each of the queries may include a large plurality of different search indices and the method further comprises:
eliminating redundant URIs in the search queries, and normalizing ranking of the different search indices before crawling.

10. The method of 1 or 2, wherein the method further comprises:
accepting input keywords and URIs from a user to define the topic;
monitoring conversations related to the topic to determine a list of influential publishers; and
directly engaging one or more of said publishers by the user for targeted ad placement.

* * * * *